US011405651B2

(12) United States Patent
Deng et al.

(10) Patent No.: US 11,405,651 B2
(45) Date of Patent: Aug. 2, 2022

(54) INTRA VIDEO CODING USING MULTIPLE REFERENCE FILTERS

(71) Applicants:Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Hongbin Liu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/480,216

(22) Filed: Sep. 21, 2021

(65) Prior Publication Data

US 2022/0007059 A1    Jan. 6, 2022

Related U.S. Application Data

(63) Continuation of application No. PCT/CN2020/088587, filed on May 5, 2020.

(30) Foreign Application Priority Data

May 2, 2019    (WO) ................ PCT/CN2019/085406

(51) Int. Cl.
*H04N 19/132*    (2014.01)
*H04N 19/80*    (2014.01)
(Continued)

(52) U.S. Cl.
CPC .......... *H04N 19/80* (2014.11); *H04N 19/132* (2014.11); *H04N 19/176* (2014.11); *H04N 19/593* (2014.11)

(58) Field of Classification Search
CPC ... H04N 19/132; H04N 19/176; H04N 19/593
See application file for complete search history.

(56) References Cited

U.S. PATENT DOCUMENTS 8,275,051 B2    9/2012    Hannuksela et al.
9,369,708 B2    6/2016    Zhang et al.
(Continued)

FOREIGN PATENT DOCUMENTS

CN    101505425 A    8/2009
CN    106170093 A    11/2016
(Continued)

OTHER PUBLICATIONS

Bross et al. ""Versatile Video Coding (Draft 4),"" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M1001, 2019.
(Continued)

*Primary Examiner* — Tsion B Owens
(74) *Attorney, Agent, or Firm* — Perkins Coie LLP

(57) ABSTRACT

A video processing method is provided to comprise: determining, based on a rule, whether to use a 4-tap interpolation filter for a conversion between a current video block of a current video unit of a video and a coded representation of the video, wherein the current video block is coded using intra mode in the coded representation; and performing the conversion based on the determining.

20 Claims, 10 Drawing Sheets

(51) Int. Cl.
*H04N 19/176* (2014.01)
*H04N 19/593* (2014.01)

(56) References Cited

U.S. PATENT DOCUMENTS

| | | | |
|---|---|---|---|
| 9,516,306 | B2 | 12/2016 | Zhang et al. |
| 9,615,090 | B2 | 4/2017 | Zhang et al. |
| 10,757,420 | B2 | 8/2020 | Zhang et al. |
| 10,812,817 | B2 | 10/2020 | Li et al. |
| 2006/0126962 | A1 | 6/2006 | Sun |
| 2006/0280428 | A1 | 12/2006 | He et al. |
| 2012/0082224 | A1 | 4/2012 | Van Der Auwera et al. |
| 2015/0023405 | A1 | 1/2015 | Joshi et al. |
| 2017/0332075 | A1 | 11/2017 | Karczewicz et al. |
| 2018/0091825 | A1 | 3/2018 | Zhao et al. |
| 2018/0376148 | A1 | 12/2018 | Zhang et al. |
| 2019/0166370 | A1 | 5/2019 | Xiu et al. |
| 2021/0105485 | A1 | 4/2021 | Zhang et al. |
| 2021/0258608 | A1* | 8/2021 | Filippov .............. H04N 19/117 |
| 2021/0289197 | A1* | 9/2021 | Ko .......................... H04N 19/46 |

FOREIGN PATENT DOCUMENTS

| | | |
|---|---|---|
| CN | 108293137 A | 7/2018 |
| CN | 108353171 A | 7/2018 |
| WO | 2018221817 A1 | 6/2018 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. ""Algorithm description for Versatile Video Coding and Test Model 4 (VTM 4),"" Joint Video Experts Team (JVET)of ITU-T SG 16 WP3 and ISO/IEC JTC 1/SC 29/WG 1113th Meeting: Marrakech, MA, Jan. 9-18, 2019, document JVET-M1002, 2019.

Chien et al. ""Methodology and Reporting Template for Tool Testing,"" Joint Video Exploration Team (JVET)of ITU-T SG 16 WP 3 and ISO/IEC JTC 1/SC 29/WG 1113th Meeting: Marrakech, MA, Jan. 9-18, 2019, document JVET-M1005, 2019.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Lin et al. ""Non-CE3: Harmonization Between WAIP and Intra Smoothing Filters,"" Joint Video Experts Team (JVET)of ITU-T SG 16 WP 3 and ISO/IEC JTC 1/SC 29/WG 1114th Meeting: Geneva, CH, Mar. 19-27, 2019, document JVET-N0435, 2019.

Matsuo et al. "Improved Intra Angular Prediction by DCT-Based Interpolation Filter," 20th European Signal Processing Conference (EUSIPCO), Bucharest, Romania, Aug. 27-31, 2012.

VTM software: https://vcgit.hhi.fraunhofer.de/jvet/VVCSoftware_VTM.git.

International Search Report and Written Opinion from International Patent Application No. PCT/CN2020/088587 dated Jul. 24, 2020 (12 pages).

International Search Report and Written Opinion from International Patent Application No. PCT/CN2020/090193 dated Aug. 12, 2020 (13 pages).

* cited by examiner

800

Determining, based on a rule, whether to use a 4-tap interpolation filter for a conversion between a current video block of a current video unit of a video and a coded representation of the video, wherein the current video block is coded using intra mode in the coded representation — 812

Performing the conversion based on the determining — 814

822 — Generating, for a current video block of a video unit of a video, an intra prediction block using interpolation filters from one or more sets of interpolation filters for the video unit 824 — Performing a conversion using between the current video block and a coded representation of the video using the prediction block

830

832 Generating, for a conversion between a current video block of a current video unit of a video and a coded representation of the video, an intra prediction block using an interpolation filter by applying the interpolation filter to reference samples, wherein the reference samples are determined according to a rule 834 Performing the conversion using the prediction block

FIG. 8C

INTRA VIDEO CODING USING MULTIPLE REFERENCE FILTERS

CROSS REFERENCE TO RELATED APPLICATIONS

This application is a continuation of International Patent Application No. PCT/CN2020/088587, filed on May 5, 2020, which claims the priority to and benefit of International Patent Application No. PCT/CN2019/085406, filed on May 2, 2019. All the aforementioned patent applications are hereby incorporated by reference in their entireties.

TECHNICAL FIELD

This patent document relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding and decoding using interpolation filters during intra coding are described.

In one example aspect, a method of video processing is disclosed. The method includes a video processing method is provided to comprise: determining, based on a rule, whether to use a 4-tap interpolation filter for a conversion between a current video block of a current video unit of a video and a coded representation of the video, wherein the current video block is coded using intra mode in the coded representation; and performing the conversion based on the determining.

In another example aspect, another method of video processing is disclosed. The method includes generating, for a conversion between a current video block of a current video unit of a video and a coded representation of the video, an intra prediction block using an interpolation filter by applying the interpolation filter to reference samples, wherein the reference samples are determined according to a rule; and performing the conversion using the prediction block.

In yet another aspect, a video encoder apparatus comprising a processor configured to implement an above-described method is disclosed.

In yet another aspect, a video decoder apparatus comprising a processor configured to implement an above-described method is disclosed.

In yet another aspect, a computer readable medium is disclosed. The computer readable medium has code for execution of one of above-described methods stored thereon.

The above and other aspects and features of the disclosed technology are described in greater detail in the drawings, the description and the claims.

BRIEF DESCRIPTION OF THE DRAWINGS

FIG. 8A to 8C are flowcharts for example methods of a video processing based on some implementations of the disclosed technology.

DETAILED DESCRIPTION

Figure 1:
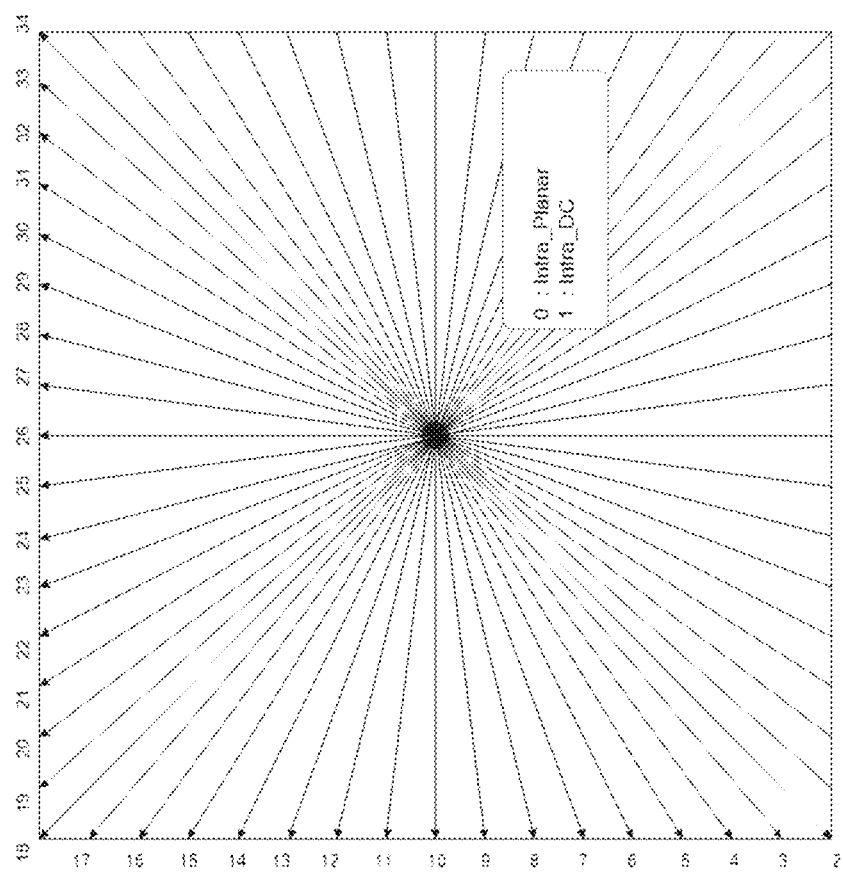
FIG. 1 shows an example of 33 intra prediction directions.

Section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

This document is related to video coding technologies. Specifically, it is related to intra coding process in video coding. It may be applied to the existing video coding standard like HEVC, or the standard (Versatile Video Coding) to be finalized. It may be also applicable to future video coding standards or video codec.

2. INITIAL DISCUSSION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

2.1 Intra Prediction in HEVC/H.265

Intra prediction involves producing samples for a given TB (transform block) using samples previously reconstructed in the considered colour channel. The intra prediction mode is separately signalled for the luma and chroma channels, with the chroma channel intra prediction mode optionally dependent on the luma channel intra prediction mode via the 'DM_CHROMA' mode. Although the intra prediction mode is signalled at the PB (prediction block) level, the intra prediction process is applied at the TB level, in accordance with the residual quad-tree hierarchy for the CU, thereby allowing the coding of one TB to have an effect on the coding of the next TB within the CU, and therefore reducing the distance to the samples used as reference values.

HEVC includes 35 intra prediction modes a DC mode, a planar mode and 33 directional, or 'angular' intra prediction modes. The 33 angular intra prediction modes are illustrated in FIG. 1.

FIG. 1 shows an example of 33 intra prediction directions.

For PBs associated with chroma colour channels, the intra prediction mode is specified as either planar, DC, horizontal, vertical, 'DM_CHROMA' mode or sometimes diagonal mode '34'.

Note for chroma formats 4:2:2 and 4:2:0, the chroma PB may overlap two or four (respectively) luma PBs; in this case the luma direction for DM_CHROMA is taken from the top left of these luma PBs.

The DM_CHROMA mode indicates that the intra prediction mode of the luma colour channel PB is applied to the chroma colour channel PBs. Since this is relatively common, the most-probable-mode coding scheme of the intra_chroma_pred_mode is biased in favor of this mode being selected.

2.2 67 Intra Prediction Modes in VVC

To capture arbitrary edge directions presented in natural video, the number of directional intra modes in VTM4 is extended from 33, as used in HEVC to 65. The new directional modes not in HEVC are depicted as dotted arrows in FIG. 2 and the planar and DC modes remain the same.

These denser directional intra prediction modes apply for all block sizes and for both luma and chroma intra predictions.

The intra prediction mode and associated intra prediction mode index is: Planar (0) or DC (1), Vertical (50), HOR (18), Top-left Mode (34), Top-right Mode (66).

Figure 2:
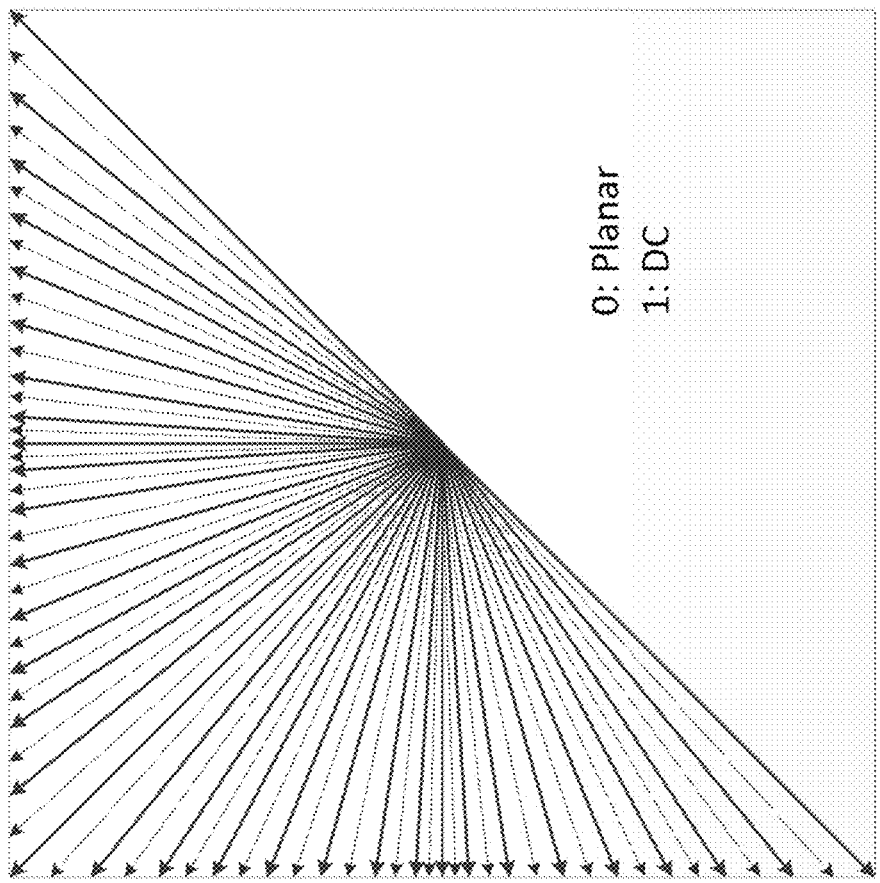
FIG. 2 shows examples of new and old intra prediction modes.

FIG. 2 shows examples of new and old intra prediction modes.

Figure 3:
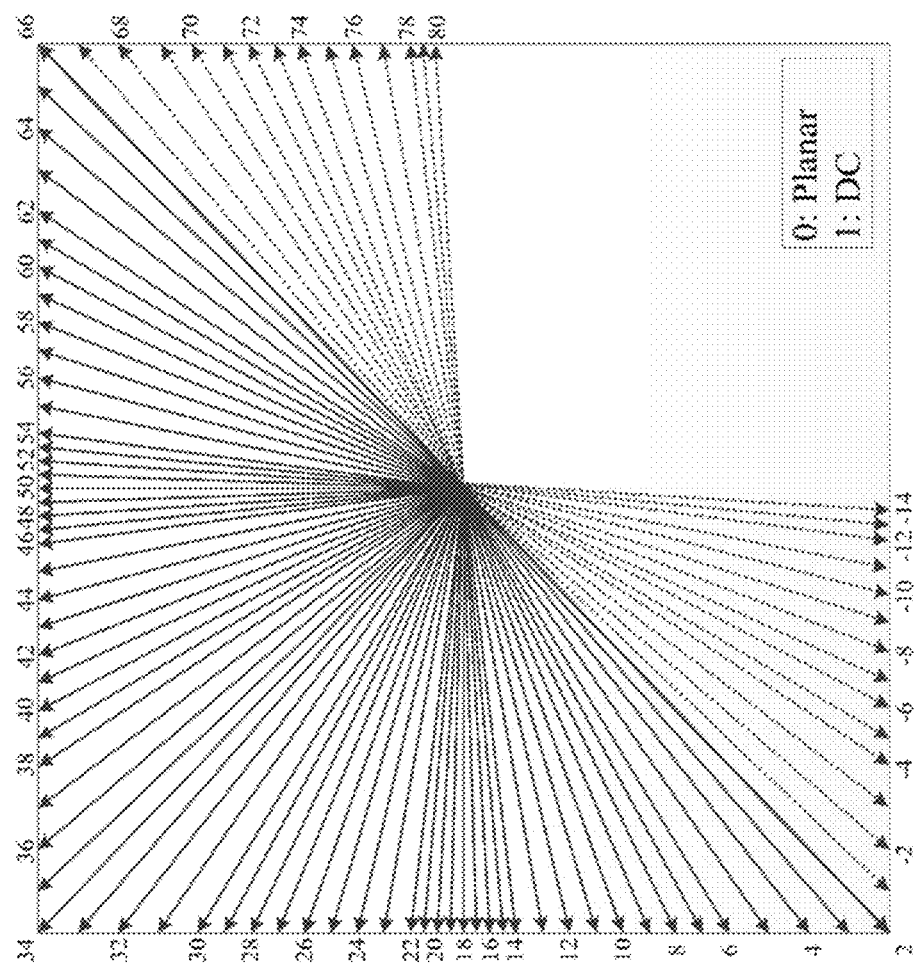
FIG. 3 shows an example of intra mode index for 67 intra prediction modes.

FIG. 3 shows an example of intra mode index for 67 intra prediction modes.

2.3 Wide-Angle Intra Prediction for Non-Square Blocks (WAIP)

Conventional angular intra prediction directions are defined from 45 degrees to −135 degrees in clockwise direction. In VTM4, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

2.4 Intra Sub-Partitions (ISP)

Figure 4A:
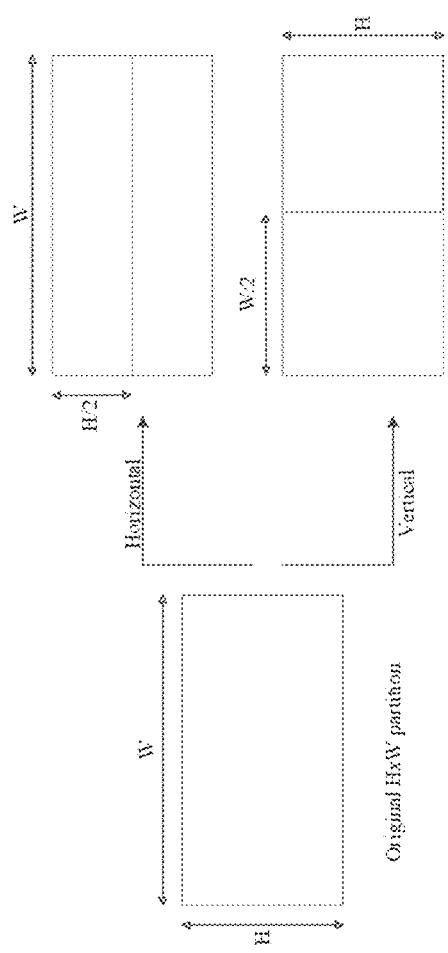
FIG. 4A shows examples of sub-partitions for 4×8 and 8×4 CUs.
Figure 4B:
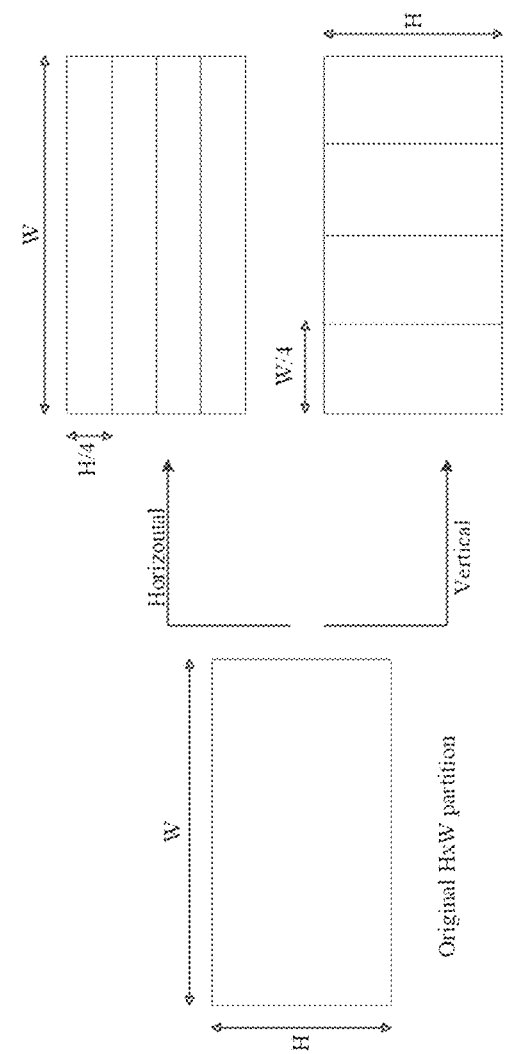
FIG. 4B shows examples of sub-partitions for CUs other than 4×8, 8×4 and 4×4.

The Intra Sub-Partitions (ISP) tool divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. FIG. 4A-4B shows examples of the two possibilities. All sub-partitions fulfill the condition of having at least 16 samples.

FIG. 4A shows examples of sub-partitions for 4×8 and 8×4 CUs.

FIG. 4B shows examples of sub-partitions for CUs other than 4×8, 8×4 and 4×4.

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode.

2.5 Mode Dependent Intra Smoothing (MDIS) and 4-Tap Reference Sample Interpolation Filter Four-tap intra interpolation filters are utilized to improve the directional intra prediction accuracy. In HEVC, a two-tap bilinear interpolation filter has been used to generate the intra prediction block in the directional prediction modes (i.e., excluding Planar and DC predictors). In the VTM4, simplified 6-bit 4-tap Gaussian interpolation filter and 6-bit 4-tap DCT-IF chroma filter are used for only directional intra modes. Non-directional intra prediction process is unmodified. The selection of the 4-tap filters is performed according to the MDIS condition for directional intra prediction modes that provide non-fractional displacements, i.e. to all the directional modes excluding the following: 2, HOR_IDX, DIA_IDX, VER_IDX, 66 . . . .

Depending on the intra prediction mode, the following reference samples processing is performed:

1. The directional intra-prediction mode is classified into one of the following groups:

A. vertical or horizontal modes (HOR_IDX, VER_IDX),

B. diagonal modes that represent angles which are multiple of 45 degree (2, DIA_IDX, VDIA_IDX . . . ), C. remaining directional modes;

2. If the directional intra-prediction mode is classified as belonging to group A, then then no filters are applied to reference samples to generate predicted samples;
3. Otherwise, if a mode falls into group B, then a [1, 2, 1] reference sample filter may be applied (depending on the MDIS condition) to reference samples to further copy these filtered values into an intra predictor according to the selected direction, but no interpolation filters are applied;
4. Otherwise, if a mode is classified as belonging to group C, then only an intra reference sample interpolation filter is applied to reference samples to generate a predicted sample that falls into a fractional or integer position between reference samples according to a selected direction (no reference sample filtering is performed).

2.5.1 Intra Reference Sample Interpolation Filter in VVC Specification/Working Draft The following texts are extracted from VVC working draft JVET-M1001-v7.

8.4.4.2.7.  *Specification of INTRA_ANGULAR2.. INTRA_ANGULAR66 intra prediction modes*

Inputs to this process are:
  the intra prediction mode predModeIntra,
  a variable refIdx specifying the intra prediction reference line index,
  a variable nTbW specifying the transform block width,
  a variable nTbH specifying the transform block height,
  a variable refW specifying the reference samples width,
  a variable refH specifying the reference samples height,
  a variable nCbW specifying the coding block width,
  a variable nCbH specifying the coding block height,
  a variable cIdx specifying the colour component of the current block,
  the neighbouring samples p[x][y], with x=−1−refIdx, y=−1−refIdx . . . refH−1 and x=−refIdx . . . refW−1, y−=1−refIdx.

Outputs of this process are the modified intra prediction mode predModeIntra and the predicted samples predSamples[x][y], with x=0 . . . nTbW−1, y=0 . . . nTbH−1.

The variable nTbS is set equal to (Log 2 (nTbW)+Log 2 (nTbH))>>1.

The variables nW and nH are derived as follows:
  If IntraSubPartitionsSplitType is equal to ISP_NO_SPLIT or cIdx is not equal to 0, the following applies:

$nW=nTbW$ (8-125)

$nH=nTbH$ (8-126)

Otherwise (IntraSubPartitionsSplitType is not equal to ISP_NO_SPLIT and cIdx is equal to 0), the following applies:

$nW=nCbW$ (8-127)

$nH=nCbH$ (8-128)

The variable whRatio is set equal to Abs(Log 2 (nW/nH)).
The variable wideAngle is set equal to 0.
For non-square blocks (nW is not equal to nH), the intra prediction mode predModeIntra is modified as follows:
  If all of the following conditions are true, wideAngle is set equal to 1 and predModeIntra is set equal to (predModeIntra+65).
    nW is greater than nH
    predModeIntra is greater than or equal to 2
    predModeIntra is less than (whRatio>1) ? (8+2*whRatio): 8
  Otherwise, if all of the following conditions are true, wideAngle is set equal to 1 and predModeIntra is set equal to (predModeIntra−67).
    nH is greater than nW
    predModeIntra is less than or equal to 66
    predModeIntra is greater than (whRatio>1) ? (60−2*whRatio): 60
The variable filterFlag is derived as follows:
  If one or more of the following conditions is true, *filterFlag is set equal to 0.*
    predModeIntra is equal to INTRA_ANGULAR2, INTRA_ANGULAR34 or INTRA_ANGULAR66
    refIdx is not equal to 0
    *IntraSubPartitionsSplitType is not equal to ISP_NO_SPLIT and cIdx is equal to 0 and predModeIntra is greater than or equal to INTRA_ ANGULAR34 and nW is greater than 8*
    *IntraSubPartitionsSplitType is not equal to ISP_NO_SPLIT and cIdx is* equal to 0 and predModeIntra is less than INTRA_ANGULAR34 and nH is greated than 8.
  Otherwise, the following applies:
    The variable minDistVerHor is set equal to Min(Abs (predModeIntra−50), Abs(predModeIntra−18)).
    The variable intraHorVerDistThres[nTbS] is specified in Table 8-4.
    The variable filterFlag is derived as follows:
      If minDistVerHor is greater than intraHorVerDistThres[nTbS] or wideAngle is equal to 1, filterFlag is set equal to 1.
      Otherwise, filterFlag is set equal to 0.

TABLE 8-4

Specification of intraHorVerDistThres[ nTbS ] for various transform block sizes nTbS

| | nTbS = 2 | nTbS = 3 | nTbS = 4 | nTbS = 5 | nTbS = 6 | nTbS = 7 |
|---|---|---|---|---|---|---|
| intraHorVerDistThres[ nTbS ] | 16 | 14 | 2 | 0 | 0 | 0 |

Figure 5:
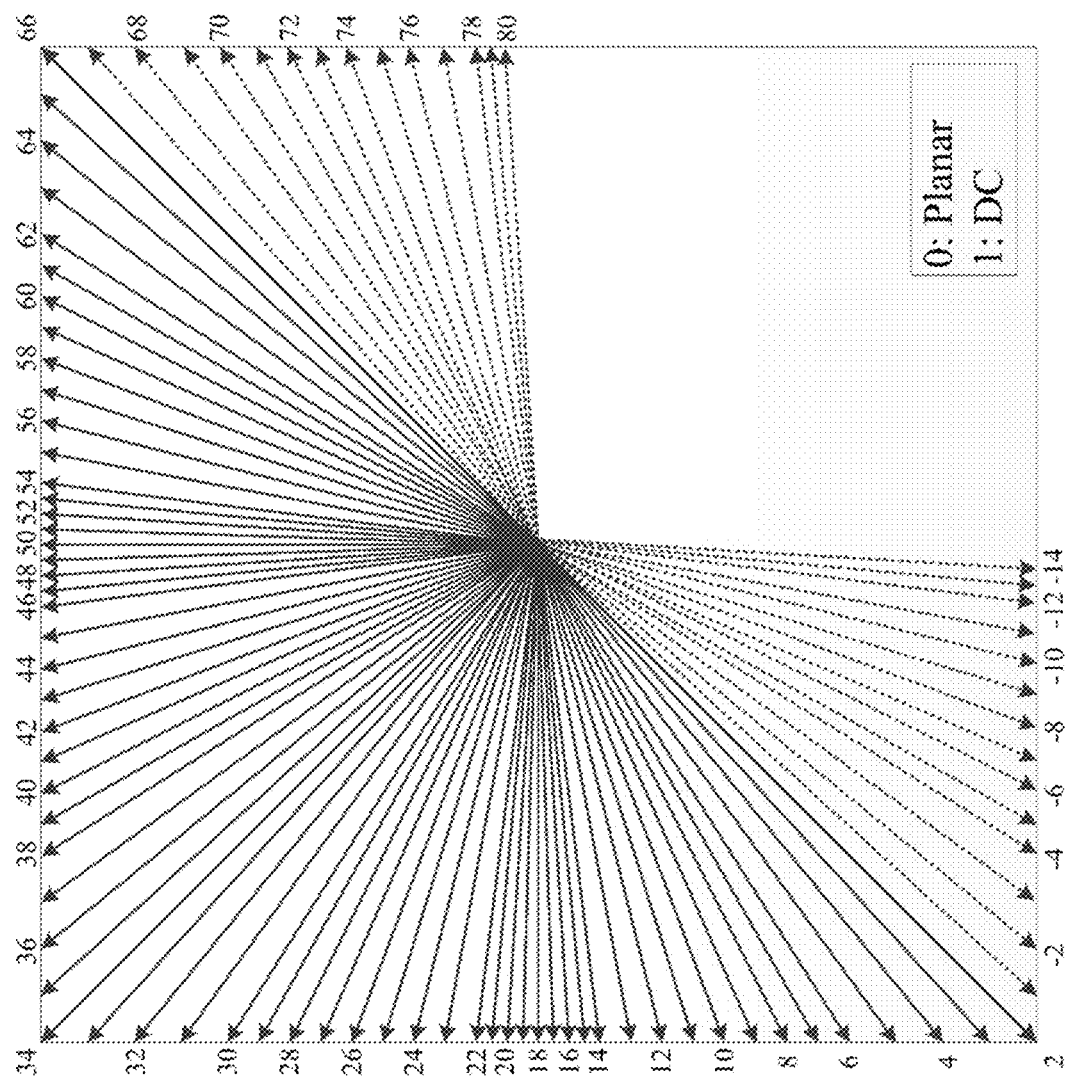
FIG. 5 shows an example of intra modes.

FIG. 8-1 (of VVC) that is FIG. 5 of the present application
Intra prediction directions (informative) FIG. 8-1, which is
FIG. 5 of the present application, illustrates the 93 prediction
directions, where the dashed directions are associated with
the wide-angle modes that are only applied to non-square
blocks.

Table 8-5 specifies the mapping table between predModeIntra and the angle parameter intraPredAngle.

TABLE 8-5

Specification of intraPredAngle

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

The inverse angle parameter invAngle is derived based on intraPredAngle as follows:

$$invAngle = \text{Round}\left(\frac{256*32}{intraPredAngle}\right) \quad (8\text{-}129)$$

The interpolation filter coeffcients fC[phase][j] and fG[phase][j] with phase=0 ... 31 and j=0 ... 3 are specified in Table 8-6.

TABLE 8-6

Specification of interpolation filter coefficients fC and fG

| Fractional sample position p | fC interpolation filter coefficients | | | | fG interpolation filter coefficients | | | |
|---|---|---|---|---|---|---|---|---|
| | fC[ p ][ 0 ] | fC[ p ][ 1 ] | fC[ p ][ 2 ] | fC[ p ][ 3 ] | fG[ p ][ 0 ] | fG[ p ][ 1 ] | fG[ p ][ 2 ] | fG[ p ][ 3 ] |
| 0 | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 15 | 29 | 17 | 3 |
| 3 | −2 | 60 | 7 | −1 | 14 | 29 | 18 | 3 |
| 4 | −2 | 58 | 10 | −2 | 13 | 29 | 18 | 4 |
| 5 | −3 | 57 | 12 | −2 | 13 | 28 | 19 | 4 |
| 6 | −4 | 56 | 14 | −2 | 13 | 28 | 19 | 4 |
| 7 | −4 | 55 | 15 | −2 | 12 | 28 | 20 | 4 |
| 8 | −4 | 54 | 16 | −2 | 11 | 28 | 20 | 5 |
| 9 | −5 | 53 | 18 | −2 | 11 | 27 | 21 | 5 |
| 10 | −6 | 52 | 20 | −2 | 10 | 27 | 22 | 5 |
| 11 | −6 | 49 | 24 | −3 | 9 | 27 | 22 | 6 |
| 12 | −6 | 46 | 28 | −4 | 9 | 26 | 23 | 6 |
| 13 | −5 | 44 | 29 | −4 | 9 | 26 | 23 | 6 |
| 14 | −4 | 42 | 30 | −4 | 8 | 25 | 24 | 7 |
| 15 | −4 | 39 | 33 | −4 | 8 | 25 | 24 | 7 |
| 16 | −4 | 36 | 36 | −4 | 8 | 24 | 24 | 8 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 27 | 9 |
| 22 | −2 | 20 | 52 | −6 | 5 | 22 | 27 | 10 |
| 23 | −2 | 18 | 53 | −5 | 5 | 21 | 27 | 11 |
| 24 | −2 | 16 | 54 | −4 | 5 | 20 | 28 | 11 |
| 25 | −2 | 15 | 55 | −4 | 4 | 20 | 28 | 12 |
| 26 | −2 | 14 | 56 | −4 | 4 | 19 | 28 | 13 |
| 27 | −2 | 12 | 57 | −3 | 4 | 19 | 28 | 13 |
| 28 | −2 | 10 | 58 | −2 | 4 | 18 | 29 | 13 |
| 29 | −1 | 7 | 60 | −2 | 3 | 18 | 29 | 14 |

TABLE 8-6-continued

Specification of interpolation filter coefficients fC and fG

| Fractional sample position p | fC interpolation filter coefficients | | | | fG interpolation filter coefficients | | | |
|---|---|---|---|---|---|---|---|---|
| | fC[ p ][ 0 ] | fC[ p ][ 1 ] | fC[ p ][ 2 ] | fC[ p ][ 3 ] | fG[ p ][ 0 ] | fG[ p ][ 1 ] | fG[ p ][ 2 ] | fG[ p ][ 3 ] |
| 30 | 0 | 4 | 62 | −2 | 3 | 17 | 29 | 15 |
| 31 | 0 | 2 | 63 | −1 | 3 | 17 | 29 | 15 |

The values of the prediction samples predSamples[x][y], with x=0 ... nTbW−1, y=0 ... nTbH−1 are derived as follows:
If predModeIntra is greater than or equal to 34, the following ordered steps apply:
1. The reference sample array ref[x] is specified as follows:
   The following applies:

ref[x]=p[−1−refIdx+x][−1−refIdx], with x=0 ...
   nTbW+refIdx  (8-130)

If intraPredAngle is less than 0, the main reference sample array is extended as follows:
   When (nTbH*intraPredAngle)>>5 is less than −1, ref[x]=p[−1−refIdx][−1−refIdx+((x*invAngle+128)>>8)], with x=−1 ...
   (nTbH*intraPredAngle)>>5  (8-131)

ref[((nTbH*intraPredAngle)>>5)−1]=ref[(nTbH*intraPredAngle)>>5]  (8-132)

ref[nTbW+1+refIdx]=ref[nTbW+refIdx]  (8-133)

Otherwise, ref[x]=p[−1−refIdx+x][−1−refIdx], with x=nTbW+1+refIdx ... refW+refIdx  (8-134)

ref[−1]=ref[0]  (8-135)

The additional samples ref[refW+refIdx+x] with x=1 ... (Max(1, nTbW/nTbH)*refIdx+1) are derived as follows:

ref[refW+refIdx+x]=p[−1+refW][−1−refIdx]  (8-136)

2. The values of the prediction samples predSamples[x][y], with x=0 ... nTbW−1, y=0 ... nTbH−1 are derived as follows:
   The index variable iIdx and the multiplication factor iFact are derived as follows:

iIdx=((y+1+refIdx)*intraPredAngle)>>5+refIdx  (8-137)

iFact=((y+1+refIdx)*intraPredAngle) & 31  (8-138)

If cIdx is equal to 0, the following applies:
   The interpolation filter coefficients fT[j] with j=0 ... 3 are derived as follows:

fT[j]=filterFlag?fG[iFact][j]:fC[iFact][j]  (8-139)

The value of the prediction samples predSamples[x][y] is derived as follows:

predSamples[x][y]=Clip1Y(((Σ$_{i=0}^{3}$fT[i]*ref[x+iIdx+i])+32)>>6)  (8-140)

Otherwise (cIdx is not equal to 0), depending on the value of iFact, the following applies:
   If iFact is not equal to 0, the value of the prediction samples predSamples[x][y] is derived as follows:

predSamples[x][y]((32−iFact)*ref[x+iIdx+1]+iFact*ref[x+iIdx+2]+16)>>5  (8-141)

Otherwise, the value of the prediction samples predSamples[x][y] is derived as follows:

predSamples[x][y]=ref[x+iIdx+1]  (8-142)

Otherwise (predModeIntra is less than 34), the following ordered steps apply:
1. The reference sample array ref[x] is specified as follows:
   The following applies:

ref[x]=p[−1−refIdx][−1−refIdx+x], with x=0 ...
   nTbH+refIdx  (8-143)

If intraPredAngle is less than 0, the main reference sample array is extended as follows:
   When (nTbW*intraPredAngle)>>5 is less than −1, ref[x]=p[−1−refIdx+((x*invAngle+128)>>8)][−1−refIdx], with x=−1 ... (nTbW*intraPredAngle)>>5  (8-144)

ref[((nTbW*intraPredAngle)>>5)]=ref[(nTbW*intraPredAngle)>>5]  (8-145)

ref[nTbG+1+refIdx]=ref[nTbH+refIdx]  (8-146)

Otherwise, ref[x]=p[−1−refIdx][−1−refIdx+x], with x=nTbH+1+refIdx ... refH+refIdx  (8-147)

ref[−1]=ref[0]  (8-148)

The additional samples ref[refH+refIdx+x] with x=1 ... (Max(1, nTbW/nTbH)*refIdx+1) are derived as follows:

ref[refH+refIdx+x]=p[−1+refH][−1−refIdx]  (8-149)

2. The values of the prediction samples predSamples[x][y], with x=0 ... nTbW−1, y=0 ... nTbH−1 are derived as follows:
   The index variable iIdx and the multiplication factor iFact are derived as follows:

iIdx=((x+1+refIdx)*intraPredAngle)>>5  (8-150)

iFact=((x+1+refIdx)*intraPredAngle) & 31  (8-151)

If cIdx is equal to 0, the following applies:
   The interpolation filter coefficients fT[j] with j=0 ... 3 are derived as follows:

fT[j]=filterFlag?fG[iFact][j]: fC[iFact][j]  (8-152)

The value of the prediction samples predSamples[x][y] is derived as follows:

predSamples[x][y]=Clip1Y(((Σ$_{i=0}^{3}$fT[i]*ref[y+iIdx+i])+32)>>6)  (8-153)

Otherwise (cIdx is not equal to 0), depending on the value of iFact, the following applies:

If iFact is not equal to 0, the value of the prediction samples predSamples[x][y] is derived as follows:

predSamples[x][y]=((32 iFact)*ref[y+iIdx+1]+
   iFact*ref[y+iIdx+2]+16)>>5          (8-154)

Otherwise, the value of the prediction samples predSamples[x][y] is derived as follows:

predSamples[x][y]=ref[y+iIdx+1]          (8-155)

2.5.2 Adoption of JVET-N0435

In the past JVET-N meeting, JVET-N0435 was adopted to harmonize between WAIP and the usage of the MDIS and reference sample interpolation filters. If a wide-angle mode represents a non-fractional offset. There are 8 modes in the wide-angle modes satisfy this condition, which are [−14, −12, −10, −6, 72, 76, 78, 80]. When a block is predicted by these modes. It's proposed to directly copy from the particular sample in the reference buffer without applying any interpolation. Instead, reference filter is conditionally applied to these modes to smooth the predictor. With this modification, the number of samples needed to be smoothing is reduced. Besides, it aligns the design of non-fractional modes in the conventional prediction modes and wide-angle modes.

2.5.3 Corresponding Modified Working Draft in JVET-N0435

The following texts are extracted from modified VVC working draft provided by JVET-N0435. The modifications are highlighted by *bold italics*.

8.4.4.2.1. General Intra Sample Prediction

Inputs to this process are:
- a sample location (xTbCmp, yTbCmp) specifying the top-left sample of the current transform block relative to the top-left sample of the current picture,
- a variable predModeIntra specifying the intra prediction mode,
- a variable nTbW specifying the transform block width,
- a variable nTbH specifying the transform block height,
- a variable nCbW specifying the coding block width,
- a variable nCbH specifying the coding block height,
- a variable cIdx specifying the colour component of the current block.

Outputs of this process are the predicted samples predSamples[x][y], with x=0 . . . nTbW−1, y=0 . . . nTbH−1.

The variables refW and refH are derived as follows:
   If IntraSubPartitionsSplitType is equal to ISP_NO_SPLIT or cIdx is not equal to 0, the following applies:

refW=nTbW*2          (8-103)

refH=nTbH*2          (8-104)

Otherwise (IntraSubPartitionsSplitType is not equal to ISP_NO_SPLIT and cIdx is equal to 0), the following applies:

refW=nCbW*2          (8-105)

refH=nCbH*2          (8-106)

The variable refIdx specifying the intra prediction reference line index is derived as follows:

refIdx = ( cIdx = = 0 ) ? IntraLumaRefLineIdx
   [ xTbCmp ][ yTbCmp ] : 0          (8-107)

The variables nW and nH are derived as follows:
   If IntraSubPartitionsSplitType is equal to
      ISP_NO_SPLIT or cIdx is
      not equal to 0, the following applies:
   *nW = nTbW*          *(8-125)*
   *nh = nTbH*          *(8-126)*
   Otherwise ( IntraSubPartitionsSplitType is not equal
      to ISP_NO_SPLIT and cIdx is equal to 0 ), the following
      applies:
   *nW = nCbW*          *(8-127)*
   *nH = nCbH*          *(8-128)*
   *The variable whRatio is set equal* to Abs( Log2( nW / nH ) ).
   *The variable wideAngle is set equal to 0.*
   *For non-square blocks (nW is not equal to nH),*

*the intra prediction mode predModeIntra is modified as follows:*
      *If all of the following conditions are true,*
         *predModeIntra is set equal to ( predModeIntra + 65 ).*
         *nW is greater than nH*
         *predModeIntra is greater than or equal to 2*
         *predModeIntra is less than*
            *( whRatio > 1 ) ? ( 8 + 2 * whRatio ) : 8*
      *Otherwise, if all of the following conditions*
         *are true, predModeIntra is set*
         *equal to ( predModeIntra − 67 ).*
         *nH is greater than nW*
         *predModeIntra is less than or equal to 66*
         *predModeIntra is greater than ( whRatio > 1 )*
         *? ( 60 − 2 * whRatio ) : 60*
      *The variable RefFilterFlag is derived as follows:*

*If predModeIntra is equal to INTRA_PLANAR,*
         *−14, −12, −10, −6, 2, 34, 66, 72, 76, 78 or 80, RefFilterFlag*
         *is set to 1*
      *Otherwise, RefFilterFlag is set to 0*

For the generation of the reference samples p[x][y] with x=−1−refIdx, y=−1−refIdx . . . refH−1 and x=−refIdx . . . refW−1, y=−1−refIdx, the following ordered steps apply:
   1. The reference sample availability marking process as specified in clause 8.4.4.2.2 is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=−1−refIdx, y=−1−refIdx . . . refH−1 and x=−refIdx . . . refW−1, y=−1−refIdx as output.
   2. When at least one sample refUnfilt[x][y] with x=−1−refIdx, y=−1−refIdx . . . refH−1 and x=−refIdx . . . refW−1, y=−1−refIdx is marked as "not available for intra prediction", the reference sample substitution process as specified in clause 8.4.4.2.3 is invoked with the intra prediction reference line index refIdx, the reference sample width refW, the reference sample height refH, the reference samples refUnfilt[x][y] with x=−1−refIdx, y=−1−refIdx . . . refH−1 and x=−refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as output.
   3. The reference sample filtering process as specified in clause 8.4.4.2.4 is invoked with the intra prediction reference line index refIdx, the transform block width nTbW and height nTbH, the reference sample width refW, the reference sample height refH, *the reference filter flag RefFilterFlag,* the unfiltered samples refUnfilt[x][y] with x=−1−refIdx, y=−1−refIdx . . . refH−1 and x=−refIdx . . . refW−1, y=−1−refIdx, and the colour component index cIdx as inputs, and the reference samples p[x][y] with x=−1−refIdx, y=−1−refIdx . . . refH−1 and x=−refIdx . . . refW−1, y=−1−refIdx as output.

The intra sample prediction process according to predModeIntra applies as follows:

- If predModeIntra is equal to INTRA_PLANAR, the corresponding intra prediction mode process specified in clause 8.4.4.2.5 is invoked with the transform block width nTbW, and the transform block height nTbH, and the reference sample array p as inputs, and the output is the predicted sample array predSamples.
- Otherwise, if predModeIntra is equal to INTRA_DC, the corresponding intra prediction mode process specified in clause 8.4.4.2.6 is invoked with the transform block width nTbW, the transform block height nTbH, and the reference sample array p as inputs, and the output is the predicted sample array predSamples.
- Otherwise, if predModeIntra is equal to INTRA_LT_CCLM, INTRA_L_CCLM or INTRA_T_CCLM, the corresponding intra prediction mode process specified in clause 8.4.4.2.8 is invoked with the intra prediction mode predModeIntra, the sample location (xTbC, yTbC) set equal to (xTbCmp, yTbCmp), the transform block width nTbW and height nTbH, and the reference sample array p as inputs, and the output is the predicted sample array predSamples.
- Otherwise, the corresponding intra prediction mode process specified in clause 8.4.4.2.7 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, *the reference filter flag RefFilterFlag,* the colour component index cIdx, and the reference sample array p as inputs, and the predicted sample array predSamples as outputs.

When all of the following conditions are true, the position-dependent prediction sample filtering process specified in clause 8.4.4.2.9 is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, the reference samples p[x][y], with x=1, y=−1 . . . refH−1 and x=0 . . . refW−1, y=−1, and the colour component index cIdx as inputs, and the output is the modified predicted sample array predSamples:

- IntraSubPartitionsSplitType is equal to ISP_NO_SPLIT or cIdx is not equal to 0
- refIdx is equal to 0 or cIdx is not equal to 0
- One of the following conditions is true:
  - predModeIntra is equal to INTRA_PLANAR
  - predModeIntra is equal to INTRA_DC
  - predModeIntra is equal to INTRA_ANGULAR18
  - predModeIntra is equal to INTRA_ANGULAR50
  - predModeIntra is less than or equal to INTRA_ANGULAR10
  - predModeIntra is greater than or equal to INTRA_ANGULAR58

8.4.4.2.4. *Reference sample filtering process*

Inputs to this process are:
- a variable refIdx specifying the intra prediction reference line index,
- a variable nTbW specifying the transform block width,
- a variable nTbH specifying the transform block height,
- a variable refW specifying the reference samples width,
- a variable refH specifying the reference samples height,
- *a variable RefFilterFlag specifying the reference filter flag,*
- the (unfiltered) neighbouring samples refUnfilt[x][y], with x=−1−refIdx, y=−1−refIdx . . . refH−1 and x=−refIdx . . . refW−1, y=−1−refIdx,
- a variable cIdx specifying the colour component of the current block.

Outputs of this process are the reference samples p[x][y], with x=−1−refIdx, y=−1−refIdx . . . refH−1 and x=−refIdx . . . refW−1, y=−1−refIdx.

The variable filterFlag is derived as follows:
- If all of the following conditions are true, filterFlag is set equal to 1:
  - refIdx is equal to 0
  - nTbW*nTbH is greater than 32
  - cIdx is equal to 0
  - IntraSubPartitionsSplitType is equal to ISP_NO_SPLIT
  - *RefFilterFlag is equal to 1*
- Otherwise, filterFlag is set equal to 0.

For the derivation of the reference samples p[x][y] the following applies:
- If filterFlag is equal to 1, the filtered sample values p[x][y] with x=−1, y=−1 . . . refH−1 and x=0 . . . refW−1, y=−1 are derived as follows:

$$p[-1][-1]=(refUnfilt[-1][0]+2*refUnfilt[-1][-1]+refUnfilt[0][-1]+2)>>2 \qquad (8\text{-}111)$$

$$p[-1][y]=(refUnfilt[-1][y+1]+2*refUnfilt[-1][y]+refUnfilt[-1][y-1]+2)>>2 \text{ for } y=0 \ldots refH-2 \qquad (8\text{-}112)$$

$$p[-1][refH-1]=refUnfilt[-1][refH-1] \qquad (8\text{-}113)$$

$$p[x][-1]=(refUnfilt[x-1][-1]+2*refUnfilt[x][-1]+refUnfilt[x+1][-1]+2)>>2 \text{ for } x=0 \ldots refW-2 \qquad (8\text{-}114)$$

$$p[refW-1][-1]=refUnfilt[refW-1][-1] \qquad (8\text{-}115)$$

- Otherwise, the reference samples values p[x][y] are set equal to the unfiltered sample values refUnfilt[x][y] with x=−1−refIdx, y=−1−refIdx . . . refH−1 and x=−refIdx . . . refW−1, y=−1−refIdx.

8.4.4.2.7. *Specification of INTRA_ANGULAR2 . . INTRA_ANGULAR66 intra prediction modes*

Inputs to this process are:
- the intra prediction mode predModeIntra,
- a variable refIdx specifying the intra prediction reference line index,
- a variable nTbW specifying the transform block width,
- a variable nTbH specifying the transform block height,
- a variable refW specifying the reference samples width,
- a variable refH specifying the reference samples height,
- a variable nCbW specifying the coding block width,
- a variable nCbH specifying the coding block height,
- *a variable RefFilterFlag specifying the reference filter flag,*
- a variable cIdx specifying the colour component of the current block, the neighbouring samples p[x][y], with x=−1−refIdx, y=−1−refIdx . . . refH−1 and x=−refIdx . . . refW−1, y=−1−refIdx.

*Outputs of this process are the predicted samples predSamples [ x ][ y ], with x = 0..nTbW − 1, y = 0..nTbH − 1.*

The variable nTbS is set equal to (Log 2 (nTbW)+Log 2 (nTbH))>>1.

The variable filterFlag is derived as follows:
  If one or more of the following conditions is true, *filterFlag is set equal to 0.*
    predModeIntra is equal to INTRA_ANGULAR2, INTRA_ANGULAR34 or INTRA_ANGULAR66
    refIdx is not equal to 0
    *IntraSubPartitionsSplitType is not*
      *equal to ISP_NO_SPLIT and cIdx*
      *is equal to 0 and predModeIntra is*
      *greater than or equal to INTRA_*
      *ANGULAR34 and nW is greater than 8*
    *IntraSubPartitionsSplitType is not*
      *equal to ISP_NO_SPLIT and cIdx is*
      *equal to 0 and predModeIntra is*
      *less than INTRA_ANGULA*
      *R34 and nH is greater than 8.*
  Otherwise, the following applies:
    The variable minDistVerHor is set equal to Min(Abs (predModeIntra−50), Abs(predModeIntra−18)).
    The variable intraHorVerDistThres[nTbS] is specified in Table 8-4.
    The variable filterFlag is derived as follows:
      If minDistVerHor is greater than intraHorVerDistThres[nTbS] *and RefFilterFlag is equal to 0*, filterFlag is set equal to 1.
      Otherwise, filterFlag is set equal to 0.

TABLE 8-4

Specification of intraHorVerDistThres[ nTbS ] for various transform block sizes nTbS

| | nTbS = 2 | nTbS = 3 | nTbS = 4 | nTbS = 5 | nTbS = 6 | nTbS = 7 |
|---|---|---|---|---|---|---|
| intraHorVerDistThres[ nTbS ] | 16 | 14 | 2 | 0 | 0 | 0 |

1. Examples of Problems Solved by Embodiments

There are several problems in the current design of intra prediction design, which are described below.

4-tap interpolation filter is used for all kinds of block sizes. For small block sizes, like 4×4, using 4-tap interpolation filter may bring too much computational complexity.

The 6-bit 4-tap DCT-IF chroma filter $F_C$ is used for ISP-coded blocks with specific block size and identified prediction mode. To be more specific, in Section 8.4.4.2.7 of JVET-M1001-v7, if one or more of the following conditions is true, filterFlag is set equal to 0 (which means the interpolation filter coefficients fC in Table 8-6 would be used).
  IntraSubPartitionsSplitType is not equal to ISP_NO_SPLIT and cIdx is equal to 0 and predModeIntra is greater than or equal to INTRA_ANGULAR34 and nW is greater than 8
  IntraSubPartitionsSplitType is not equal to ISP_NO_SPLIT and cIdx is equal to 0 and predModeIntra is less than INTRA_ANGULAR34 and nH is greater than 8.

The reference sample used for interpolation are erroneously calculated by the reference line index, for example, the index variable iIdx and the multiplication factor iFact are derived as follows: iIdx=((y+1+refIdx)* intraPredAngle)>>5+refIdx

4. EXAMPLE LISTING OF EMBODIMENTS AND TECHNIQUES

The detailed inventions below should be considered as examples to explain general concepts. These inventions should not be interpreted in a narrow way. Furthermore, these inventions can be combined in any manner.

In the following description, "Fc" denotes the 4-tap DCT-IF chroma filter, "$F_G$" denotes the 4-tap Gaussian filter, and both are specified in Table 8-6 of VVC working draft JVET-M1001-v7. "bilinear/linear filter" denotes the 2-tap filter as specified in equation (8-141) and equation (8-154) of VVC working draft JVET-M1001-v7. Other kinds of variances of DCT-IF/Gaussian/bilinear/linear filters may be also applicable.

In the following description, "block" may indicate CU/PU/TU as defined in VVC. A block may contain different color components such as Y/U/V component, or R/G/B component, or just corresponds to one color component. The methods may be applicable for either color component of a block, or all color components of a block. The width and height of a block are denoted as W and H, respectively.

Multiple Interpolation Filters Supported for Coding One Video Unit (e.g., One Brick/Tile/Tile Group/Slice)

1. Multiple interpolation filters for intra prediction processes may be pre-defined.
   a) Alternatively, indications of one or multiple sets of multiple interpolation filters may be signaled in sequence/picture/slice/other video unit level.
      i. In one example, they may be signaled in SPS/VPS/PPS/picture header/slice header/APS/tile group header/tile header etc. al.
   b) Interpolation filter to be used may be changed from one video unit to anther video unit.
      i. In one example, a video unit may be a sequence/picture/view/slice/tile group/tile/brick/CTU row/CTU/CU/PU/TU/VPDU.
      ii. In one example, indications of selected
   c) Selection of multiple interpolation filters may depend on block dimension.
   d) Selection of multiple interpolation filters may depend on color component.
   e) Selection of multiple interpolation filters may depend on coding methods.
      i. In one example, the coding methods may include normal intra prediction method, ISP, affine intra prediction method, MRL, etc. al.

2. It is proposed that whether 4-tap interpolation filter (e.g., 4-tap cubic filter, or DCT-IF chroma filter, or gaussian filter, etc.) is used or not may depend on the block dimension.
   a) In one example, whether 4-tap interpolation filter is used or not may depend on the width or height of a TU.
      i. In one example, 4-tap interpolation filter may be used when W or H is greater than a threshold T1 (e.g., T1=8).
      ii. Alternatively, 4-tap interpolation filter may be used when W or H is equal to or less than a threshold T2 (e.g., T2=32).

iii. Alternatively, furthermore, the 4-tap interpolation filter may be disabled for other blocks.
b) In one example, whether 4-tap interpolation filter is used or not may depend on the size of a TU.
   i. In one example, 4-tap interpolation filter may be used when W*H is greater than a threshold T1 wherein T1 is a threshold.
      1. In one example, T1=32, which means 4×4/8×4/4×8/2×8/8×2/16×2/2×16/1×16/16×1/32×1/1×32 block may not use 4-tap interpolation filter.
   ii. Alternatively, 4-tap interpolation filter may be used when W*H is equal to or less than a threshold T2 (e.g., T2=64).
   iii. Alternatively, furthermore, the 4-tap interpolation filter may be disabled for other blocks.
c) In one example, 4-tap interpolation filter may be used when W is greater than T1 and H is greater than T2 (e.g., T1=8, T2=8).
   i. In one example, 4×4/4×8/8×8 block may not apply 4-tap interpolation filter.
   ii. Alternatively, 4-tap interpolation filter may be used when W is no larger than T1 and H is no larger than a threshold T2 (e.g., T1=64, T2=64).
   iii. Alternatively, furthermore, the 4-tap interpolation filter may be disabled for other blocks.
d) When 4-tap interpolation filter is disallowed, 2-tap filter (e.g., 2-tap bilinear filter) may be used.
   i. In one example, bilinear/linear filter may be used for small size TUs.
      1. In one example, bilinear filter may be used to generate the intra prediction block in the directional prediction modes for TU size (e.g., width*height) less than or equal to N pixels, such as N=32. In one example, 4×4/8×4/4×8/2×8/8×2/16×2/2×16/1×16/16×1/32×1/1×32 TU may use bilinear filter.
e) In one example, the thresholds mentioned above may be the same for all color components.
   i. Alternatively, the thresholds may be dependent on the color component.
3. It is proposed that whether 4-tap filter $F_G$ (aka. Gaussian filter) is used or not may depend on the prediction information and/or block size.
a) In one example, whether $F_G$ is used for intra-coded (or ISP-coded) block or not may depend on the block size.
   i. In one example, $F_G$ may be used for intra-coded (or ISP-coded) block with block width or height greater than a threshold T, such as T=8.
   ii. In one example, $F_G$ may be used for intra-coded (or ISP-coded) block with block size (e.g., width*height) greater than a threshold T, such as T=32.
   iii. In one example, $F_G$ may be used for intra-coded (or ISP-coded) block with block width multiplied by height (e.g., W*H) greater than a predefined size T1*T2, in which W>T1, H>T2, such as T1=8, T2=8.
   iv. In one example, for ISP-coded luma blocks, if the intra prediction mode index for one sub-partition satisfy certain conditions (such as is greater than or equal to INTRA_ANGULAR34) and the sub-partition width is greater than 8, $F_G$ filter is enabled.
      1. Alternatively, furthermore, for ISP-coded luma blocks, if the intra prediction mode index for one sub-partition satisfy certain conditions (such as is less than INTRA_ANGULAR34) and the sub-partition height is greater than 8, $F_G$ filter is enabled.
      2. Alternatively, furthermore, for the other cases of ISP-coded luma blocks, $F_G$ filter may be disabled.
   v. In one example, for ISP-coded luma blocks, if the intra prediction mode index for one sub-partition satisfy certain conditions (such as is greater than or equal to INTRA_ANGULAR34) and the block width (i.e., CU) is greater than 8, $F_G$ filter may be enabled.
      1. Alternatively, furthermore, for ISP-coded luma blocks, if the intra prediction mode index for one sub-partition satisfy certain conditions (such as is less than INTRA_ANGULAR34) and the block width (i.e., CU) height is greater than 8, $F_G$ filter may be enabled.
      2. Alternatively, furthermore, for the other cases of ISP-coded luma blocks, $F_G$ filter may be disabled.
b) In one example, whether $F_G$ is used for intra-coded (or ISP-coded) block or not may depend on the block width/height and the prediction mode.
   i. In one example, $F_G$ may be used for Intra-coded (or ISP-coded) block with prediction mode greater than or equal to the vertical prediction mode (such as intra mode 34 in VVC) and block width greater than a threshold T, such as T=8.
   ii. In one example, $F_G$ may be used for Intra-coded (or ISP-coded) block with prediction mode less than the vertical prediction mode (such as intra mode 34 in VVC) and block height greater than N pixels, such as N=8.
c) When $F_G$ is disallowed, $F_C$ (aka. DCI-IF chroma filter), or cubic filter, or bilinear filter may be used.
   i. In one example, $F_C$, or cubic filter, or bilinear filter may be used for Intra-coded (or ISP-coded) block with size W*H<=T, such as T=32.
   i. In one example, $F_C$, or cubic filter, or bilinear filter may be used for Intra-coded (or ISP-coded) block with prediction mode greater than or equal to the vertical prediction mode (such as intra mode 34 in VVC) and block width W<T, such as T=8.
   i. In one example, $F_C$, or cubic filter, or bilinear filter may be used for Intra-coded (or ISP-coded) block with prediction mode less than the vertical prediction mode (such as intra mode 34 in VVC) and block height H<T, such as T=8.
4. For ISP-coded blocks (e.g., CUs), how to select the interpolation filter or other filters applied to reference samples may depend on the dimension of the CU.
a) Alternatively, how to select the interpolation filter or other filters applied to reference samples may depend on the dimension of the sub-partition.
5. The reference sample used for interpolation may depend on the reference line index.
a) In one example, the index variable iIdx and the multiplication factor iFact may be derived by iIdx=((y+1+refIdx)*intraPredAngle)>>5, where the refIdx denotes the reference line index where the reference sample is located at, intraPredAngle is derived from the intra prediction mode and the look up table Table 8-5 as defined in VVC working draft JVET-M1001-v7.
6. Proposed method may be applied to all or certain color components.
a) In one example, proposed method may be applied to luma component only.
b) In one example, proposed method may be applied to luma, Cb and Cr component.
c) In one example, proposed method may be applied to luma, Cb and Cr component for YCbCr 4:4:4 format.

d) In one example, proposed method may be applied to R, G and B component for RGB format.

5. EMBODIMENTS

Below Embodiments are Based on the VVC Working Draft JVET-M1001-v7.

5.1 Embodiment #1

The embodiment below is for the method in item 2 of the invention description.
Newly added parts are highlighted in bold face italics, and double brackets are placed before and after the text deleted.
8.4.4.2.7. Specification of INTRA_ANGULAR2 . . . INTRA_ANGULAR66 Intra Prediction Modes
. . .
The values of the prediction samples predSamples[x][y], with x=0 . . . nTbW−1, y=0 . . . nTbH−1 are derived as follows:
  If predModeIntra is greater than or equal to 34, the following ordered steps apply:
    1. The reference sample array ref[x] is specified as follows:
      The following applies:

$$\text{ref}[x]=p[-1-\text{refIdx}+x][-1-\text{refIdx}], \text{ with } x=0 \ldots nTbW+\text{refIdx} \quad (8\text{-}130)$$

If intraPredAngle is less than 0, the main reference sample array is extended as follows:
        When (nTbH*intraPredAngle)>>5 is less than −1, $$\text{ref}[x]=p[-1-\text{refIdx}][-1-\text{refIdx}+((x*\text{invAngle}+128)>>8)], \text{ with } x=1 \ldots (nTbH*\text{intraPredAngle})>>5 \quad (8\text{-}131)$$

$$\text{ref}[((nTbH*\text{intraPredAngle})>>5)-1]=\text{ref}[(nTbH*\text{intraPredAngle})>>5] \quad (8\text{-}132)$$

$$\text{ref}[nTbW+1+\text{refIdx}]=\text{ref}[nTbW+\text{refIdx}] \quad (8\text{-}133)$$

Otherwise, $$\text{ref}[x]=p[-1-\text{refIdx}+x][-1-\text{refIdx}], \text{ with } x=nTbW+1+\text{refIdx} \ldots \text{ref}W+\text{refIdx} \quad (8\text{-}134)$$

$$\text{ref}[-1]=\text{ref}[0] \quad (8\text{-}135)$$

The additional samples ref[refW+refIdx+x] with x=1 . . . (Max(1, nTbW/nTbH)*refIdx+1) are derived as follows:

$$\text{ref}[\text{ref}W+\text{refIdx}+x]=p[-1+\text{ref}W][-1-\text{refIdx}] \quad (8\text{-}136)$$

2. The values of the prediction samples predSamples[x][y], with x=0 . . . nTbW−1, y=0 . . . nTbH−1 are derived as follows:
      The index variable iIdx and the multiplication factor iFact are derived as follows:

$$i\text{Idx}=((y+1+\text{refIdx})*\text{intraPredAngle})>>5+\text{refIdx} \quad (8\text{-}137)$$

$$i\text{Fact}=((y+1+\text{refIdx})*\text{intraPredAngle}) \& 31 \quad (8\text{-}138)$$

If cIdx is equal to 0 ***and nTbW*nTbH is greater than M***, the following applies:
        The interpolation filter coefficients fT[j] with j=0 . . . 3 are derived as follows:

$$fT[j]=\text{filterFlag}?fG[i\text{Fact}][j]:fC[i\text{Fact}][j] \quad (8\text{-}139)$$

The value of the prediction samples predSamples[x][y] is derived as follows:

$$\text{predSamples}[x][y]=\text{Clip1}Y(((\Sigma_{i=0}^{3}fT[i]*\text{ref}[x+i\text{Idx}+i])+32)>>6) \quad (8\text{-}140)$$

Otherwise [[(cIdx is not equal to 0)]], depending on the value of iFact, the following applies:
        If iFact is not equal to 0, the value of the prediction samples predSamples[x][y] is derived as follows:

$$\text{predSamples}[x][y]=((32-i\text{Fact})*\text{ref}[x+i\text{Idx}+1]+i\text{Fact}*\text{ref}[x+i\text{Idx}+2]+16)>>5 \quad (8\text{-}141)$$

Otherwise, the value of the prediction samples predSamples[x][y] is derived as follows:

$$\text{predSamples}[x][y]=\text{ref}[x+i\text{Idx}+1] \quad (8\text{-}142)$$

Otherwise (predModeIntra is less than 34), the following ordered steps apply:
    3. The reference sample array ref[x] is specified as follows:
      The following applies:

$$\text{ref}[x]=p[-1-\text{refIdx}][-1-\text{refIdx}+x], \text{ with } x=0 \ldots nTbH+\text{refIdx} \quad (8\text{-}143)$$

If intraPredAngle is less than 0, the main reference sample array is extended as follows:
        When (nTbW*intraPredAngle)>>5 is less than 1, $$\text{ref}[x]=p[-1-\text{refIdx}+((x*\text{invAngle}+128)>>8)][-1-\text{refIdx}], \text{ with } x=1 \ldots (nTbW*\text{intraPredAngle})>>5 \quad (8\text{-}144)$$

$$\text{ref}[((nTbW*\text{intraPredAngle})>>5)-1]=\text{ref}[(nTbW*\text{intraPredAngle})>>5] \quad (8\text{-}145)$$

$$\text{ref}[nTbG+1+\text{refIdx}]=\text{ref}[nTbH+\text{refIdx}] \quad (8\text{-}146)$$

Otherwise, $$\text{ref}[x]=p[-1-\text{refIdx}][-1-\text{refIdx}+x], \text{ with } x=nTbH+1+\text{refIdx} \ldots \text{ref}H+\text{refIdx} \quad (8\text{-}147)$$

$$\text{ref}[-1]=\text{ref}[0] \quad (8\text{-}148)$$

The additional samples ref[refH+refIdx+x] with x=1 . . . (Max(1, nTbW/nTbH)*refIdx+1) are derived as follows:

$$\text{ref}[\text{ref}H+\text{refIdx}+x]=p[-1+\text{ref}H][-1-\text{refIdx}] \quad (8\text{-}149)$$

4. The values of the prediction samples predSamples[x][y], with x=0 . . . nTbW−1, y=0 . . . nTbH−1 are derived as follows:
      The index variable iIdx and the multiplication factor iFact are derived as follows:

$$i\text{Idx}=((x+1+\text{refIdx})*\text{intraPredAngle})>>5 \quad (8\text{-}150)$$

$$i\text{Fact}=((x+1+\text{refIdx})*\text{intraPredAngle}) \& 31 \quad (8\text{-}151)$$

If cIdx is equal to 0 ***and nTbW*nTbH is greater than M***, the following applies:
        The interpolation filter coefficients fT[j] with j=0 . . . 3 are derived as follows:

$$fT[j]=\text{filterFlag}?fG[i\text{Fact}][j]:fC[i\text{Fact}][j] \quad (8\text{-}152)$$

The value of the prediction samples predSamples[x][y] is derived as follows:

$$\text{predSamples}[x][y]=\text{Clip1}Y(((\Sigma_{i=0}^{3}fT[i]*\text{ref}[y+i\text{Idx}+i])+32)>>6) \quad (8\text{-}153)$$

Otherwise[[(cIdx is not equal to 0)]], depending on the value of iFact, the following applies:
If iFact is not equal to 0, the value of the prediction samples predSamples[x][y] is derived as follows:

predSamples[x][y]=((32−iFact)*ref[y+iIdx+1]+
iFact*ref[y+iIdx+2]+16)>>5    (8-154)

Otherwise, the value of the prediction samples predSamples[x][y] is derived as follows:

predSamples[x][y]=ref[y+iIdx+1]    (8-155)

In one example, M is set to 32 or 16.

5.2 Embodiment #2

The embodiment below is for the method in item 3 of the invention description.
Newly added parts are highlighted in bold face italics, and double brackets are placed before and after the text deleted.
8.4.4.2.7. Specification of INTRA_ANGULAR2 . . . INTRA_ANGULAR66 Intra Prediction Modes
The variable filterFlag is derived as follows:
 If one or more of the following conditions is true, filterFlag is set equal to 0.
  predModeIntra is equal to INTRA_ANGULAR2, INTRA_ANGULAR34 or INTRA_ANGULAR66
  refIdx is not equal to 0
 *Otherwise, if IntraSubPartitionsSplitType is not equal to ISP_NO_SPLIT , the following apply:*
  If cIdx is equal to 0 and predModeIntra is greater than or equal to INTRA_ANGULAR34 and [[nW]] *nTbH* is greater than 8, *filterFlag is set equal to 1.*
  *else if* cIdx is equal to 0 and predModeIntra is less than INTRA_ANGULAR34 and [[nH]] *nTbH* is greater than 8, *filterFlag is set equal to 1.*
  *else , filterFlag is set equal to 0.*
 Otherwise, the following applies:
  The variable minDistVerHor is set equal to Min(Abs(predModeIntra−50), Abs(predModeIntra−18)).
  The variable intraHorVerDistThres[nTbS] is specified in Table 8-4.
  The variable filterFlag is derived as follows:
   If minDistVerHor is greater than intraHorVerDistThres[nTbS] [[and RefFilterFlag is equal to 0]] *or wideAngle is equal to 1*, filterFlag is set equal to 1.
   Otherwise, filterFlag is set equal to 0.
Alternatively, the following may apply:
8.4.4.2.7. Specification of INTRA_ANGULAR2 . . . INTRA_ANGULAR66 Intra Prediction Modes
The variable filterFlag is derived as follows:
 If one or more of the following conditions is true, filterFlag is set equal to 0.
  *cIdx is not equal to 0*
  predModeIntra is equal to[[INTRA_ANGULAR2, INTRA_ANGULAR34 or INTRA_ANGULAR66]] *−14,− 12, −10, −6, 2, 34, 66, 72, 76, 78 or 80*
  refIdx is not equal to 0
 *Otherwise, If one or more of the following conditions is true, filterFlag is set equal to 1*
  IntraSubPartitionsSplitType is not equal to ISP_NO_SPLIT [[and cIdx is equal to 0]] and predModeIntra is greater than or equal to INTRA_ANGULAR34 and [[nW]] *nTbW* is greater than 8
  IntraSubPartitionsSplitType is not equal to ISP_NO_SPLIT[[and cIdx is equal to 0]] and predModeIntra is less than INTRA_ANGULAR34 and [[nH]] *nTbH* is greater than 8
 *Otherwise, if IntraSubPartitionsSplitType is not equal to ISP_NO_SPLIT, filterFlag is set equal to 0*
 Otherwise, the following applies:
  The variable minDistVerHor is set equal to Min(Abs(predModeIntra−50), Abs(predModeIntra−18)).
  The variable intraHorVerDistThres[nTbS] is specified in Table 8-4.
  The variable filterFlag is derived as follows:
   If minDistVerHor is greater than intraHorVerDistThres[nTbS] [[and RefFilterFlag is equal to 0]] *or wideAngle is equal to 1*, filterFlag is set equal to 1.
   Otherwise, filterFlag is set equal to 0.

5.3 Embodiment #3

The embodiment below is for the method in item 3 of the invention description.
Newly added parts are highlighted in *bold face italics*, and double brackets are placed before and after the text deleted.
8.4.4.2.7. Specification of INTRA_ANGULAR2 . . . INTRA_ANGULAR66 Intra Prediction Modes
. . .
The variable filterFlag is derived as follows:
 If one or more of the following conditions is true, filterFlag is set equal to 0.
  *cIdx is not equal to 0*
  predModeIntra is equal to [[INTRA_ANGULAR2, INTRA_ANGULAR34 or INTRA_ANGULAR66]] *−14, − 12, −10, −6, 2, 34, 66, 72, 76, 78 or 80*
  refIdx is not equal to 0
 *Otherwise, If* IntraSubPartitionsSplitType is not equal to ISP_NO_SPLIT [[and cIdx is equal to 0]] and predModeIntra is greater than or equal to INTRA_ANGULAR34 and [[ *nW]]nTbW *nTbH* is greater than [[8]] *32, filterFlag is set equal to 1*
 [[IntraSubPartitionsSplitType is not equal to ISP_NO_SPLIT and cIdx is equal to 0 and predModeIntra is less than INTRA_ANGULAR34 and nH is greater than 8]]
 *Otherwise, if IntraSubPartitionsSplitType is not equal to ISP_NO_SPLIT, filterFlag is set equal to 0*
 Otherwise, the following applies:
  The variable minDistVerHor is set equal to Min(Abs(predModeIntra−50), Abs(predModeIntra−18)).
  The variable intraHorVerDistThres[nTbS] is specified in Table 8-4.
  The variable filterFlag is derived as follows:
   If minDistVerHor is greater than intraHorVerDistThres[nTbS][[and RefFilterFlag is equal to 0]] *or wideAngle is equal to 1*, filterFlag is set equal to 1.
   Otherwise, filterFlag is set equal to 0.

5.4 Embodiment #4

The embodiment below is for the method in item 4 of the invention description.
Newly added parts are highlighted in *bold face italics*, and double brackets are placed before and after the text deleted.

8.4.4.2.7. Specification of INTRA_ANGULAR2 . . . INTRA_ANGULAR66 Intra Prediction Modes
. . .
The values of the prediction samples predSamples[x][y], with x=0 . . . nTbW−1, y=0 . . . nTbH−1 are derived as follows:
  If predModeIntra is greater than or equal to 34, the following ordered steps apply:
    1. The reference sample array ref[x] is specified as follows:
      The following applies:

ref[x]=p[−1−refIdx+x][−1−refIdx], with x=0 . . .
       nTbW+refIdx    (8-130)

If intraPredAngle is less than 0, the main reference sample array is extended as follows:
        When (nTbH*intraPredAngle)>>5 is less than 1, ref[x]=p[−1−refIdx][−1−refIdx+((x*invAngle+
       128)>>8)], with x=−1 . . .
       (nTbH*intraPredAngle)>>5    (8-131)

ref[((nTbH*intraPredAngle)>>5)−1]=ref
       [(nTbH*intraPredAngle)>>5]    (8-132)

ref[nTbW+1+refIdx]=ref[nTbW+refIdx]    (8-133)

Otherwise, ref[x]=p[−1−refIdx+x][−1−refIdx], with x=nTbW+1+
       refIdx . . . refW+refIdx    (8-134)

ref[−1]=ref[0]    (8-135)

The additional samples ref[refW+refIdx+x] with x=1 . . . (Max(1, nTbW/nTbH)*refIdx+1) are derived as follows:

ref[refW+refIdx+x]=p[1+refW][−1−refIdx]    (8-136)

2. The values of the prediction samples predSamples[x][y], with x=0 . . . nTbW−1, y=0 . . . nTbH−1 are derived as follows:
  The index variable iIdx and the multiplication factor iFact are derived as follows:

iIdx=((y+1+refIdx)*intraPredAngle)>>5[[+refIdx]]    (8-137)

iFact=((y+1+refIdx)*intraPredAngle) & 31    (8-138)

If cIdx is equal to 0, the following applies:
        The interpolation filter coefficients fT[j] with j=0 . . . 3 are derived as follows:

fT[j]=filterFlag?fG[iFact][j]: fC[iFact][j]    (8-139)

The value of the prediction samples predSamples[x][y] is derived as follows:

predSamples[x][y]=Clip1Y(((Σ$_{i=0}^{3}$fT[i]*ref[x+iIdx+
       i])+32)>>6)    (8-140)

Otherwise (cIdx is not equal to 0), depending on the value of iFact, the following applies:
        If iFact is not equal to 0, the value of the prediction samples predSamples[x][y] is derived as follows:

predSamples[x][y]=((32−iFact)*ref[x+iIdx+1]+
       iFact*ref[x+iIdx+2]+16)>>5    (8-141)

Otherwise, the value of the prediction samples predSamples[x][y] is derived as follows:

predSamples[x][y]=ref[x+iIdx+1]    (8-142)

Figure 6:
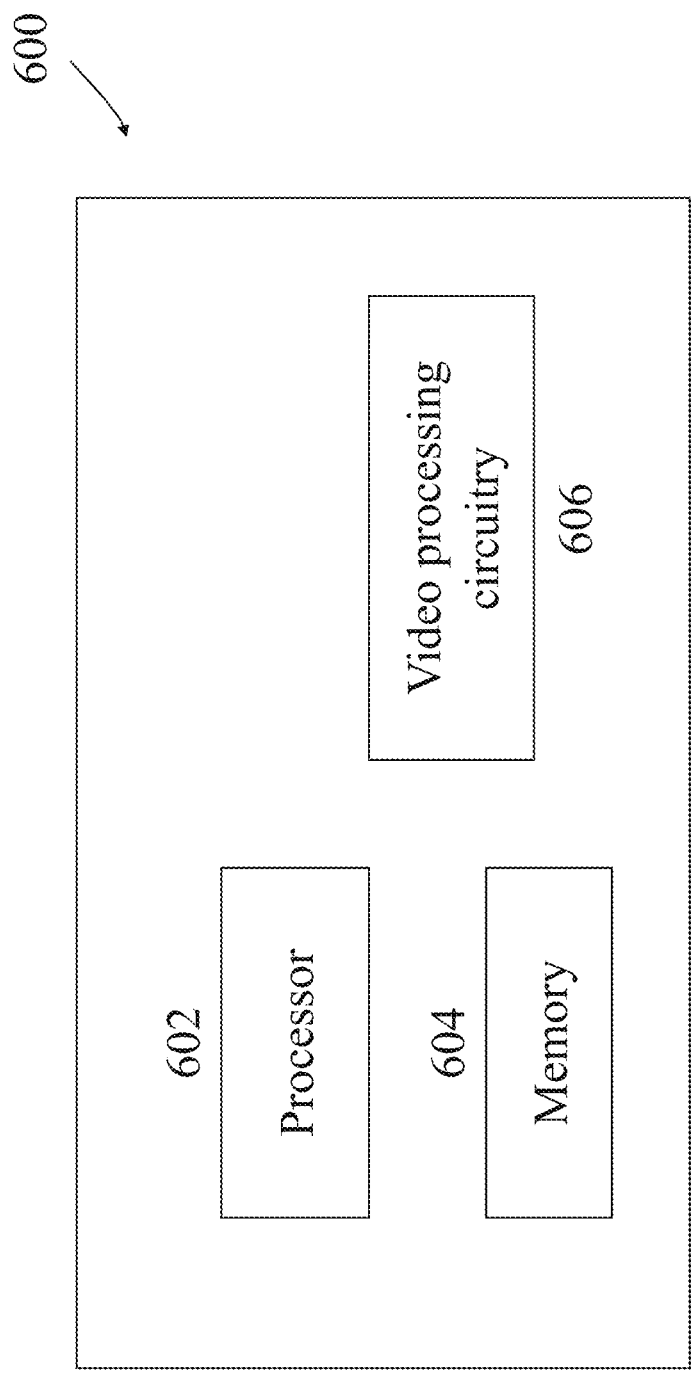
FIGS. 6 and 7 are block diagrams of examples of a video processing apparatus.

FIG. 6 is a block diagram of a video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing hardware 606. The processor(s) 602 may be configured to implement one or more methods described in the present document. The memory (memories) 604 may be used for storing data and code used for implementing the methods and techniques described herein. The video processing hardware 606 may be used to implement, in hardware circuitry, some techniques described in the present document.

Figure 7:
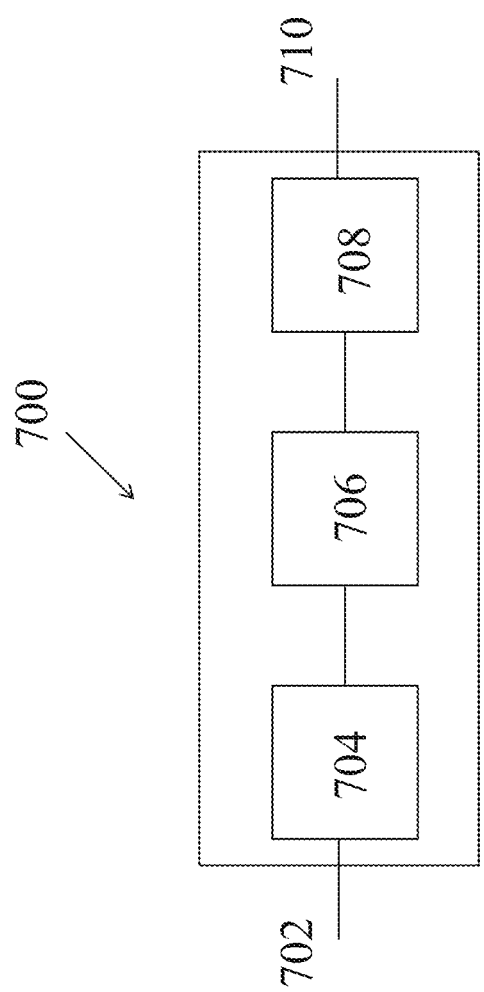

FIG. 7 is another example of a block diagram of a video processing system in which disclosed techniques may be implemented. FIG. 7 is a block diagram showing an example video processing system 700 in which various techniques disclosed herein may be implemented. Various implementations may include some or all of the components of the system 700. The system 700 may include input 702 for receiving video content. The video content may be received in a raw or uncompressed format, e.g., 8 or 10 bit multi-component pixel values, or may be in a compressed or encoded format. The input 702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 700 may include a coding component 704 that may implement the various coding or encoding methods described in the present document. The coding component 704 may reduce the average bitrate of video from the input 702 to the output of the coding component 704 to produce a coded representation of the video. The coding techniques are therefore sometimes called video compression or video transcoding techniques. The output of the coding component 704 may be either stored, or transmitted via a communication connected, as represented by the component 706. The stored or communicated bitstream (or coded) representation of the video received at the input 702 may be used by the component 708 for generating pixel values or displayable video that is sent to a display interface 710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

FIG. 8A is a flowchart of an example method 810 of video processing. The method 810 includes, at step 812, determining, based on a rule, whether to use a 4-tap interpolation filter for a conversion between a current video block of a current video unit of a video and a coded representation of the video, wherein the current video block is coded using intra mode in the coded representation. The method 810 further includes, at step 814, performing the conversion based on the determining.

Figure 8B:
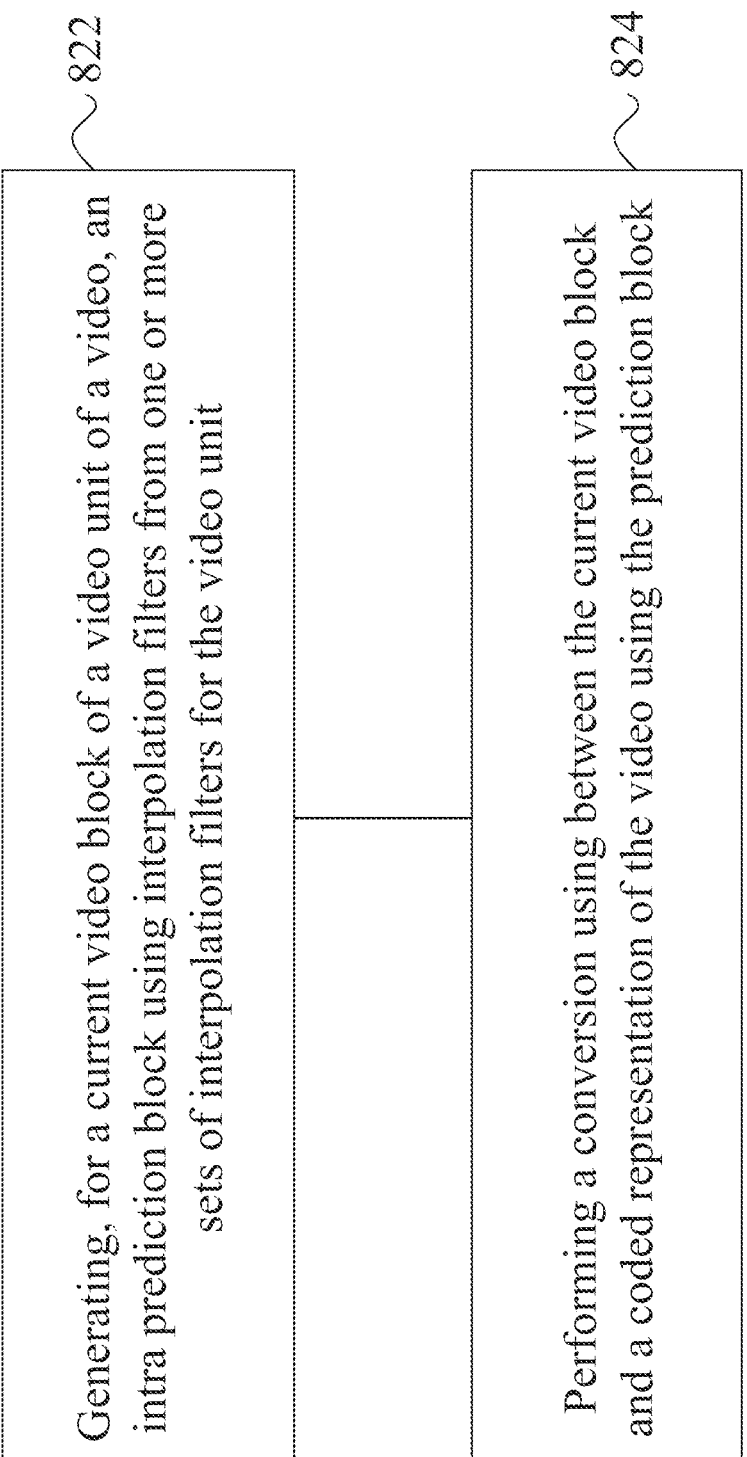

FIG. 8B is a flowchart of an example method 820 of video processing. The method 820 includes, at step 822, generating, for a current video block of a video unit of a video, an intra prediction block using interpolation filters from one or more sets of interpolation filters for the video unit. The method 820 further includes, at step 824, performing a conversion using between the current video block and a coded representation of the video using the prediction block.

FIG. 8C is a flowchart of an example method 830 of video processing. The method 830 includes, at step 832, generating, for a conversion between a current video block of a current video unit of a video and a coded representation of the video, an intra prediction block using an interpolation filter by applying the interpolation filter to reference samples, wherein the reference samples are determined according to a rule. The method 830 further includes, at step 834, performing the conversion using the prediction block.

In some embodiments, the video coding methods, for example, the methods 810 to 830, may be implemented using an apparatus that is implemented on a hardware platform as described with respect to FIG. 6 or 7. It will be appreciated that the disclosed methods and techniques will benefit video encoder and/or decoder embodiments incorporated within video processing devices such as smartphones, laptops, desktops, and similar devices by allowing the use of the techniques disclosed in the present document.

Various techniques and embodiments may be described using the following clause-based format. The first set of clauses describe certain features and aspects of the disclosed techniques in the previous section.

1. A video processing method, comprising: determining, for a conversion between a current video block of a video and a bitstream representation of the current video block, one or more interpolation filters to use during the conversion, wherein the one or more interpolation filters are from multiple interpolation filters for the video; and performing the conversion using the one or more interpolation filters.

2. The method of clause 1, wherein the bitstream representation is configured to carry indications of the multiple interpolation filters.

3. The method of clause 2, wherein the bitstream representation carries the indications at a sequence parameter set level or a video parameter set level or a picture parameter set level or a picture header or a slice header or a slice header or an adaptive parameter set level, or a tile group header or a tile header.

4. The method of clause 1, wherein the multiple interpolation filters are predefined and the bitstream representation excludes an explicit indication of the multiple interpolation filters.

5. The method of any of clauses 1 to 4, wherein different sets of the multiple interpolation filters are used during conversion of different video units.

6. The method of clause 5, wherein a video unit corresponds to a video sequence or a video picture or a video view or a video tile group or a video tile or a video brick or a video coding tree unit row or a video coding unit or a video prediction unit or a video transform unit or a VPDU.

7. The method of any of clauses 1 to 6, wherein the multiple interpolation filters are based on dimensions of the current video block or a color component identify for the current video block or a coding method used for the conversion of the current video block.

Additional examples of clauses 1-7 are disclosed in item 1 of the section 4.

8. A video processing method, comprising: determining, based on a rule, whether or not to use a 4-tap interpolation filter in an intra prediction based conversion between a current video block of a video and a bitstream representation of the current video block; an performing the conversion based on the determining whether or not to use the 4-tap interpolation filter.

9. The method of clause 8, wherein the 4-tap interpolation filter is a 4-tap cubic filter.

10. The method of clause 8, wherein the 4-tap interpolation filter is a discrete cosine transform interpolation filter.

11. The method of clause 8, wherein the 4-tap interpolation filter is a gaussian filter.

12. The method of any of clauses 8 to 11, wherein the rule specifies whether or not to use the 4-tap interpolation according to a dimension of the current video block.

13. The method of clause 12, wherein the dimension is a width in pixels of the current video block.

14. The method of clause 12, wherein the dimension is a height in pixels of the current video block.

15. The method of any of clauses 8 to 11, wherein the rule specifies whether or not to use the 4-tap interpolation according to a dimension of transform unit of the current video block.

16. The method of any of clauses 12 to 15, wherein the rule specifies to use the 4-tap interpolation filter in a case that the dimension is above a first threshold T1 or below a second threshold T2.

17. The method of any of clauses 8 to 16, wherein the rule specifies to use a 2-tap filter in a case that the 4-tap interpolation filter is not to be used for the conversion.

18. The method of any of clauses 16-17, wherein the first threshold or the second threshold has a value that is dependent on a color component to which the current video block belongs.

19. The method of clause 11, wherein the rule specifies whether or not to use the 4-tap interpolation filter based on a dimension and/or a prediction mode of the current video block.

20. The method of clause 19, wherein the rule further uses a color component information for the current video block for specifying whether or not to use the 4-tap interpolation filter.

Additional examples of clauses 8-20 are disclosed in item 2-3 of the section 4.

21. A video processing method, comprising: determining, for a conversion between a current video block of a video and a bitstream representation of the current video block, an interpolation filter to use during the conversion; applying the interpolation filter to reference samples determined using a rule; and performing the conversion using a result of the applying.

22. The method of clause 21, wherein the rule specifies to determine the reference samples as a function of a reference line index refIdx.

23. The method of clause 22, wherein the rule specifies to determine the reference samples based on an intra prediction angle used for the current video block.

24. The method of any of clauses 1 to 23, wherein the method is applied to the current video block due to the current video block being a luma video block.

25. The method of any of clauses 1 to 23, wherein the method is applied to the current video block due to the current video block being a color video block.

26. The method of clause 25, wherein the method is applied to the current video block due to the current video block being a Cb video block.

27. The method of clause 25, wherein the method is applied to the current video block due to the current video block being an R (red) video block.

Additional examples of clauses 21-27 are disclosed in item 4-5 of the section 4.

28. A video processing apparatus comprising a processor configured to implement one or more of clauses 1 to 27.

29. A computer-readable medium having code stored thereon, the code, when executed by a processor, causing the processor to implement a method recited in any one or more of clauses 1 to 27.

The second set of clauses describe certain features and aspects of the disclosed techniques in the previous section, for examples, Example Implementations 1-6.

1. A video processing method, comprising: determining, based on a rule, whether to use a 4-tap interpolation filter for a conversion between a current video block of a current video unit of a video and a coded representation of the video, wherein the current video block is coded using intra mode in the coded representation; and performing the conversion based on the determining.

2. The method of clause 1, wherein the 4-tap interpolation filter corresponds to a cubic filter, a discrete cosine transform interpolation filter, or a Gaussian filter.

3. The method of clause 1 or 2, wherein the rule specifies whether to use the 4-tap interpolation filter based on at least one of a width (W) or a height (H) of a transform block (TB) of the current video block.

4. The method of clause 3, wherein the rule specifies to use the 4-tap interpolation filter in a case that the width (W) or the height (H) is greater than a first threshold (T1) or equal to or below a second threshold (T2).

5. The method of clause 1 or 2, wherein the rule specifies whether to use the 4-tap interpolation filter based on a size of a transform block (TB) of the video block, the TB having a width (W) and a height (H).

6. The method of clause 5, wherein the rule specifies to use the 4-tap interpolation filter in a case that the size of the TB is greater than a first threshold T1 or equal to or below a second threshold T2, the size corresponding to a multiplication of W and H.

7. The method of clause 3, wherein the rule specifies to use the 4-tap interpolation filter in a case that a width (W) of a transform block (TB) of the video block is greater than a first threshold T1 and a height (H) of the transform block (TB) is greater than a second threshold T2.

8. The method of clause 3, wherein the rule specifies to use the 4-tap interpolation filter in a case that a width (W) of a transform block (TB) of the video block is not greater than a first threshold T1 and a height (H) of the transform block (TB) is not greater than a second threshold T2.

9. The method of any of clause 3 to 8, wherein the rule specifies to disable the 4-tap interpolation filter for another block of the current video unit.

10. The method of clause 1, wherein the rule specifies to use a 2-tap filter in a case that the 4-tap interpolation filter is not to be used for the conversion.

11. The method of clause 10, wherein the 2-tap filter corresponds to a bilinear or linear filter.

12. The method of any of clauses 4, 6, 7, and 8, wherein the first threshold or the second threshold has a same value for color components of the current video unit.

13. The method of any of clauses 4, 6, 7, and 8, wherein the first threshold or the second threshold has a value that is dependent on a color component of the current video unit.

14. The method of clause 1, wherein the rule specifies whether to use the 4-tap interpolation filter that corresponds to a Gaussian filter based on prediction information and/or a dimension of the current video block.

15. The method of clause 14, wherein the rule specifies whether to use the Gaussian filter for the current video block that is coded using an intra coding or an intra sub-partitions (ISP) coding depends on a size of the current video block or a transform block of the current video block.

16. The method of clause 15, wherein the rule specifies to use the Gaussian filter in a case that a width (W) or a height (H) of the current video block or a transform block of the current video block is greater than a threshold (T).

17. The method of clause 15, wherein the rule specifies to use the Gaussian filter in a case that a multiplication of a width (W) and a height (H) of the current video block or a transform block of the current video block is greater than a threshold (T).

18. The method of clause 17, wherein threshold (T) is determined as a multiplication of a first threshold (T1) and a second threshold (T2).

19. The method of clause 15, wherein the rule specifies, for the current video block that is coded using the ISP coding, to use the Gaussian filter in a case that an intra prediction mode index for a sub-partition is greater than or equal to a predefined angular prediction mode, and that a width of the sub-partition is greater than a certain value T).

20. The method of clause 15, wherein the rule specifies, for the current video block that is coded using the ISP coding, to use the Gaussian filter in a case that an intra prediction mode index for a sub-partition is less than a predefined angular prediction mode, and that a height of the sub-partition is greater than a certain value T.

21. The method of clause 19 or 20, wherein T is equal to 8.

22. The method of clause 15, wherein the rule specifies not to use the Gaussian filter for at least some of luma blocks that are coded using the intra sub-partitions (ISP) coding.

23. The method of clause 14, wherein the rule specifies whether to use the Gaussian filter for the current video block that is coded using an intra coding or an intra sub-partitions (ISP) coding depends on one or more prediction modes applied to the current video block, a width (W) and/or a height (H) of the current video block, a transform block of the current video block, or a sub-partition of the current video block.

24. The method of clause 15, wherein the rule specifies to use the Gaussian filter in a case that the current video block with the prediction mode is greater than or equal to a vertical prediction mode and the width (W) is greater than a threshold (T).

25. The method of clause 15, wherein the rule specifies to use the Gaussian filter in a case that the current video block with the prediction mode is less than a vertical prediction mode and the height (H) is greater than N samples, N being a positive integer.

26. The method of clause 14, wherein the rule specifies to use a discrete cosine transform interpolation filter, a cubic filter, or a bilinear filter for the current video block is coded using an intra coding or an intra sub-partitions (ISP) coding in a case that the Gaussian filter is not used according to the rule.

27. The method of clause 26, wherein the rule specifies to use the discrete cosine transform interpolation filter, the cubic filter, or the bilinear filter in a case that a multiplication of a width (W) and a height (H) of the current video block is greater than a threshold (T).

28. The method of clause 26, wherein the rule specifies to use the discrete cosine transform interpolation filter, the cubic filter, or the bilinear filter in a case that the current video block with a prediction mode is greater than or equal to a vertical prediction mode and a width (W) of the current video block is less than a threshold (T).

29. The method of clause 26, wherein the rule specifies to use the discrete cosine transform interpolation filter, the cubic filter, or the bilinear filter in a case that the current video block with a prediction mode is less than a vertical prediction mode and a height (H) of the current video block is less than a threshold (T).

30. The method of any of clauses 1 to 29, wherein the method is applied to all or only certain color components of the current video unit.

31. The method of clause 30, wherein the method is applied to a luma component of the current video unit.

32. The method of clause 30, wherein the method is applied to luma, Cb, and Cr components of the current video unit.

33. The method of clause 30, wherein the method is applied to luma, Cb, and Cr components for a YCbCr 4:4:4 format of the current video unit.

34. The method of clause 30, wherein the method is applied to red, green, blue components for a RGB format of the current video unit.

35. A video processing method, comprising: generating, for a current video block of a video unit of a video, an intra prediction block using interpolation filters from one or more sets of interpolation filters for the video unit; and performing a conversion using between the current video block and a coded representation of the video using the prediction block.

36. The method of clause 35, the interpolation filters are pre-defined.

37. The method of clause 35, wherein the coded representation includes indications of the interpolation filters at a video unit level.

38. The method of clause 37, wherein the coded representation includes indications of the interpolation filters at a sequence parameter set (SPS) level, a video parameter set (VPS) level, a picture parameter set (PPS) level, a picture header, a slice header, an adaptive parameter set (APS) level, a tile group header, a subpicture, or a tile header.

39. The method of any of clauses 35 to 38, wherein the interpolation filters are included in a first set that is different from a second set of interpolation filters that are determined for another video unit of the video.

40. The method of clause 35, wherein the video unit corresponds to a sequence, a picture, a subpicture, a layer, a slice, a tile group, a tile, a brick, a coding tree unit row, a coding tree unit, a coding unit, a coding block, a prediction unit, a prediction block, a transform unit, a transform block, or a video processing data unit (VPDU).

41. The method of any of clauses 35 to 40, wherein the interpolation filters are selected for the video unit based on at least one of dimensions of the current video block, a color component of the current video unit, or a coding method used for the conversion of the current video block.

42. The method of any of clauses 35 to 41, wherein the method is applied to all or only certain color components of the current video unit.

43. The method of clause 42, wherein the method is applied to a luma component of the current video unit.

44. The method of clause 42, wherein the method is applied to luma, Cb, and Cr components of the current video unit.

45. The method of clause 42, wherein the method is applied to luma, Cb, and Cr components for a YCbCr 4:4:4 format of the current video unit.

46. The method of clause 42, wherein the method is applied to red, green, blue components for a RGB format of the current video unit.

47. A video processing method, comprising: generating, for a conversion between a current video block of a current video unit of a video and a coded representation of the video, an intra prediction block using an interpolation filter by applying the interpolation filter to reference samples, wherein the reference samples are determined according to a rule; and performing the conversion using the prediction block.

48. The method of clause 47, wherein the rule specifies to determine the reference samples as a function of a reference line index.

49. The method of clause 47, wherein the rule specifies to determine the reference samples based on an intra prediction angle used for the current video block.

50. The method of any of clauses 47 to 49, wherein an index variable (iIdx) for a reference sample is derived by an equation, iIdx=((y+1+refIdx)*intraPredAngle)>>5, where refIdx denotes a reference line index indicating a location of the reference sample and intraPredAngle is derived from an intra prediction mode for the current video block.

51. The method of any of clauses 47 to 50, wherein the method is applied to all or only certain color components of the current video unit.

52. The method of clause 51, wherein the method is applied to a luma component of the current video unit.

53. The method of clause 51, wherein the method is applied to luma, Cb, and Cr components of the current video unit.

54. The method of clause 51, wherein the method is applied to luma, Cb, and Cr components for a YCbCr 4:4:4 format of the current video unit.

55. The method of clause 51, wherein the method is applied to red, green, blue components for a RGB format of the current video unit.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
determining, for a conversion between a first video block of a video and a bitstream of the video, that a first coding tool is applied for the first video block, wherein in the first coding tool, the first video block is split into multiple sub-regions in horizontal direction or vertical direction;
generating prediction samples for at least one of the multiple sub-regions based on a first reference interpolation filtering process; and
performing the conversion based on the prediction samples,
wherein in the first reference interpolation filtering process, a first 4-tap interpolation filter is applied, and wherein the multiple sub-regions use a same intra mode with the first video block, and
wherein coefficients of the first 4-tap interpolation filter fc[p][0] are defined as

| Fractional sample position p | the first 4-tap interpolation filter coefficients | | | |
|---|---|---|---|---|
| | fc[ p ][ 0 ] | fc[ p ][ 1 ] | fc[ p ][ 2 ] | fc[ p ][ 3 ] |
| 0 | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1. |

2. The method of claim 1, wherein the first 4-tap interpolation filter corresponds to a cubic filter or a discrete cosine transform interpolation filter.

3. The method of claim 1, wherein the first 4-tap interpolation filter is determined independently of a size of at least one of the multiple sub-regions.

4. The method of claim 1, wherein for a second video block without applying the first coding tool, a second reference interpolation filtering process is used, and wherein in the second reference interpolation filtering process, one of the first 4-tap interpolation filter and a second 4-tap interpolation filter is selected based on a size of the second video block, and the second 4-tap interpolation filter is different from the first 4-tap interpolation filter.

5. The method of claim 4, wherein the second 4-tap interpolation filter corresponds to a Gaussian filter.

6. The method of claim 5, wherein the first and second 4-tap interpolation filters are applied only for a luma component.

7. The method of claim 4, wherein the selection is further based on a second intra mode of the second video block and positions of reference samples of the second video block.

8. The method of claim 7, wherein in a case that an index of second intra mode is one of a first indices set, the first 4-tap interpolation filter is selected, and the first indices set is {0, −14, −12, −10, −6, 2, 34, 66, 72, 76, 78, 80}.

9. The method of claim 8, wherein in response to the index of second intra mode being not one of {18, 50} and being not of the first indices set, the reference samples being adjacent to the second video block, and a number of samples included in the second video block being larger than or equal to 1024, the second 4-tap interpolation filter is selected.

10. The method of claim 4, wherein coefficients of the second 4-tap interpolation filter fG[p][0] are defined as

| Fractional sample position p | the second 4-tap interpolation filter coefficients | | | |
|---|---|---|---|---|
| | fG[ p ][ 0 ] | fG[ p ][ 1 ] | fG[ p ][ 2 ] | fG[ p ][ 3 ] |
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |

-continued

| Fractional sample position p | the second 4-tap interpolation filter coefficients |  |  |  |
|---|---|---|---|---|
| | fG[ p ][ 0 ] | fG[ p ][ 1 ] | fG[ p ][ 2 ] | fG[ p ][ 3 ] |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15. |

11. The method of claim 1, wherein the conversion includes encoding the first video block into the bitstream.

12. The method of claim 1, wherein the conversion includes decoding the first video block from the bitstream.

13. An apparatus for processing video data comprising a processor and a non-transitory memory with instructions thereon, wherein the instructions upon execution by the processor, cause the processor to:
determine, for a conversion between a first video block of a video and a bitstream of the video, that a first coding tool is applied for the first video block, wherein in the first coding tool, the first video block is split into multiple sub-regions in horizontal direction or vertical direction;
generate prediction samples for at least one of the multiple sub-regions based on a first reference interpolation filtering process; and
perform the conversion based on the prediction samples,
wherein in the first reference interpolation filtering process, a first 4-tap interpolation filter is applied, and wherein the multiple sub-regions use a same intra mode with the first video block, and
wherein coefficients of the first 4-tap interpolation filter fc[p][0] are defined as

| Fractional sample position p | the first 4-tap interpolation filter coefficients |  |  |  |
|---|---|---|---|---|
| | fc[ p ][ 0 ] | fc[ p ][ 1 ] | fc[ p ][ 2 ] | fc[ p ][ 3 ] |
| 0 | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1. |

14. The apparatus of claim 13, wherein the first 4-tap interpolation filter corresponds to a cubic filter or a discrete cosine transform interpolation filter.

15. The apparatus of claim 13, wherein the first 4-tap interpolation filter is determined independently of a size of at least one of the multiple sub-regions.

16. The apparatus of claim 13, wherein for a second video block without applying the first coding tool, a second reference interpolation filtering process is used, and
wherein in the second reference interpolation filtering process, one of the first 4-tap interpolation filter and a second 4-tap interpolation filter is selected based on a size of the second video block, and the second 4-tap interpolation filter is different from the first 4-tap interpolation filter, and wherein the first and second 4-tap interpolation filters are applied only for a luma component, and
wherein the second 4-tap interpolation filter corresponds to a Gaussian filter.

17. The apparatus of claim 16, wherein the selection is further based on a second intra mode of the second video block and positions of reference samples of the second video block.

18. A non-transitory computer-readable storage medium storing instructions that cause a processor to:
determine, for a conversion between a first video block of a video and a bitstream of the video, that a first coding tool is applied for the first video block, wherein in the first coding tool, the first video block is split into multiple sub-regions in horizontal direction or vertical direction;
generate prediction samples for at least one of the multiple sub-regions based on a first reference interpolation filtering process; and
perform the conversion based on the prediction samples,
wherein in the first reference interpolation filtering process, a first 4-tap interpolation filter is applied, and wherein the multiple sub-regions use a same intra mode with the first video block, and
wherein coefficients of the first 4-tap interpolation filter fc[p][0] are defined as

| Fractional sample position p | the first 4-tap interpolation filter coefficients | | | |
|---|---|---|---|---|
| | fc[ p ][ 0 ] | fc[ p ][ 1 ] | fc[ p ][ 2 ] | fc[ p ][ 3 ] |
| 0 | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1. |

19. A non-transitory computer-readable recording medium storing a bitstream of a video which is generated by a method performed by a video processing apparatus, wherein the method comprises:
  determining that a first coding tool is applied for a first video block of the video, wherein in the first coding tool, the first video block is split into multiple sub-regions in horizontal direction or vertical direction;
  generating prediction samples for at least one of the multiple sub-regions based on a first reference interpolation filtering process; and
  generating the bitstream based on the prediction samples, wherein in the first reference interpolation filtering process, a first 4-tap interpolation filter is applied, and wherein the multiple sub-regions use a same intra mode with the first video block, and wherein coefficients of the first 4-tap interpolation filter fc[p][0] are defined as

| Fractional sample position p | the first 4-tap interpolation filter coefficients | | | |
|---|---|---|---|---|
| | fc[ p ][ 0 ] | fc[ p ][ 1 ] | fc[ p ][ 2 ] | fc[ p ][ 3 ] |
| 0 | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1. |

20. The non-transitory computer-readable storage medium of claim 18, wherein the first 4-tap interpolation filter corresponds to a cubic filter or a discrete cosine transform interpolation filter.

* * * * *